United States Patent
Corcoran

(10) Patent No.: US 10,331,960 B2
(45) Date of Patent: Jun. 25, 2019

(54) METHODS FOR DETECTING, IDENTIFYING AND DISPLAYING OBJECT INFORMATION WITH A MULTI-CAMERA VISION SYSTEM

(71) Applicant: FotoNation Limited, Galway (IE)

(72) Inventor: Peter Corcoran, Claregalway (IE)

(73) Assignee: FotoNation Limited, Galway (IE)

(*) Notice: Subject to any disclaimer, the term of this patent is extended or adjusted under 35 U.S.C. 154(b) by 49 days.

(21) Appl. No.: 15/591,434

(22) Filed: May 10, 2017

(65) Prior Publication Data

US 2018/0330171 A1 Nov. 15, 2018

(51) Int. Cl.
*G06K 9/00* (2006.01)
*G06K 9/46* (2006.01)
*G06K 9/62* (2006.01)

(52) U.S. Cl.
CPC ........... *G06K 9/00805* (2013.01); *G06K 9/46* (2013.01); *G06K 9/6256* (2013.01)

(58) Field of Classification Search
CPC ............. G06K 9/00791; G06K 9/4604; G06K 9/6267; G06K 9/00228; G06K 9/00288; G06K 9/00805; G06K 9/00261; G06K 9/00295; G06K 9/00201; G06K 9/00771; G06K 9/00798; G06K 9/00818; G06K 9/00973; G06K 9/3241; G06K 9/46; G06K 9/6206; G06K 9/68; G06K 9/00221; G06K 9/00234; G06K 9/00268; G06K 9/00281; G06K 9/0061; G06K 9/6293; G06K 9/00362; G06K 9/00369; G06K 9/00825; G06K 2009/3291; G06K 2209/23; G06K 2209/27; G06T 7/70; G06T 7/13;
(Continued)

(56) References Cited

U.S. PATENT DOCUMENTS 5,638,116 A 6/1997 Shimoura et al.
6,169,572 B1 1/2001 Sogawa
(Continued)

FOREIGN PATENT DOCUMENTS

EP 0874331 A2 * 10/1998 ......... G06K 9/00805

OTHER PUBLICATIONS

Anderson, Robert F., et al. "Applying Parallel Design Techniques to Template Matching with GPUs" 9th International Conference on High Performance Computing for Computational Science, VECPAR Jun. 2010.
(Continued)

*Primary Examiner* — Jose L Couso

(57) ABSTRACT

Methods for detecting, identifying and displaying object information with a multi-camera vision system. In one embodiment presence of an object is detected in a region extending above a surface and positioned beyond a border, the region including at least first and second zones. A frame of image data is acquired which spans a field of view angle corresponding to a portion of a region from a position along the border. Object detection criteria are applied to analyze and classify an image of an object among a set of object types. A determination is made whether the object is present in the first zone based on application of a first series of scan windows varying in size over a first range of window sizes relative to the size of the image frame, this only permitting detection of images limited in size to a first range of image sizes.

20 Claims, 15 Drawing Sheets

(58) Field of Classification Search
CPC ... G06T 7/73; G06T 7/74; G06T 2207/30201;
G06T 2207/10016; G06T 2207/30196;
G06T 2207/30232; G06T 2207/30236;
G06T 2207/30261; G06T 2207/30248;
G06T 2207/30252; H04N 5/23219; H04N
7/181; H04N 2013/0092; B60R 1/00;
B60R 1/002; B60R 1/06; B60R 11/04;
B60R 2001/1253; B60R 2011/004; B60R
2300/303; B60R 2300/105; B60R
2300/304; B60R 2300/802; B60R
2300/60; B60R 2300/8033; B60Q 9/008;
B60Q 1/525; B60Q 5/006; B60Q
2300/45; B60W 2420/42; B60W 2550/00;
B60W 2550/10; B60W 2750/00; G08B
13/19641; G08B 13/19608; G08G 1/167;
G08G 1/16; G08G 1/165; G08G 1/166;
B60K 31/0008
See application file for complete search history.

(56) References Cited

U.S. PATENT DOCUMENTS

| | | | |
|---|---|---|---|
| 6,370,261 | B1 | 4/2002 | Hanawa |
| 6,532,301 | B1 | 3/2003 | Krumm et al. |
| 6,545,705 | B1 | 4/2003 | Sigel et al. |
| 6,611,622 | B1 | 8/2003 | Krumm |
| 6,853,738 | B1 | 2/2005 | Nishigaki et al. |
| 7,031,496 | B2 | 4/2006 | Shimano et al. |
| 7,038,577 | B2 | 5/2006 | Pawlicki et al. |
| 7,046,822 | B1 | 5/2006 | Knoeppel et al. |
| 7,227,569 | B2 | 6/2007 | Maruya |
| 7,697,027 | B2 | 4/2010 | McMahon et al. |
| 8,872,887 | B2 | 10/2014 | Bigioi et al. |
| 8,934,680 | B2 | 1/2015 | Corcoran et al. |
| 8,982,180 | B2 | 3/2015 | Corcoran et al. |
| 8,995,715 | B2 | 3/2015 | Sultana et al. |
| 9,805,274 | B2 * | 10/2017 | Ayvaci .............. G06T 7/13 |
| 2010/0002071 | A1 | 1/2010 | Ashika |
| 2011/0216156 | A1 | 9/2011 | Bigioi et al. |
| 2014/0327774 | A1 | 11/2014 | Lu et al. |
| 2015/0206030 | A1 | 7/2015 | Sultana et al. |
| 2017/0098131 | A1 * | 4/2017 | Shashua .......... G06K 9/00805 |
| 2017/0220876 | A1 * | 8/2017 | Gao ................. G06K 9/00805 |
| 2017/0236305 | A1 * | 8/2017 | Staudenmaier .......... G06T 7/80 |
| | | | 348/148 |
| 2018/0052457 | A1 * | 2/2018 | Kim .................. H04N 13/128 |
| 2018/0120859 | A1 * | 5/2018 | Eagelberg ............ G05D 1/0088 |
| 2018/0157267 | A1 * | 6/2018 | Gao ..................... B60K 35/00 |

OTHER PUBLICATIONS

Gilpin, Sean A., et al. "Heterogeneous Ensemble Classification." In: Report. CSRI Summer Proceedings 2008, Dec. 2008.

Cabido, Raul. et al. "Hardware-Accelerated Template Matching." In: Marques J.S., Pérez de la Blanca N., Pina P. (eds) Pattern Recognition and Image Analysis. IbPRIA 2005. Lecture Notes in Computer Science, vol. 3522. Springer, Berlin, Heidelberg.

Hashimoto, Kaoru, et al. "Template matching Using DSP Slices on the FPGA." In: Computing and Networking (CANDAR), 2013. First International Symposium on Computing and Networking, Dec. 4-6, 2013.

* cited by examiner

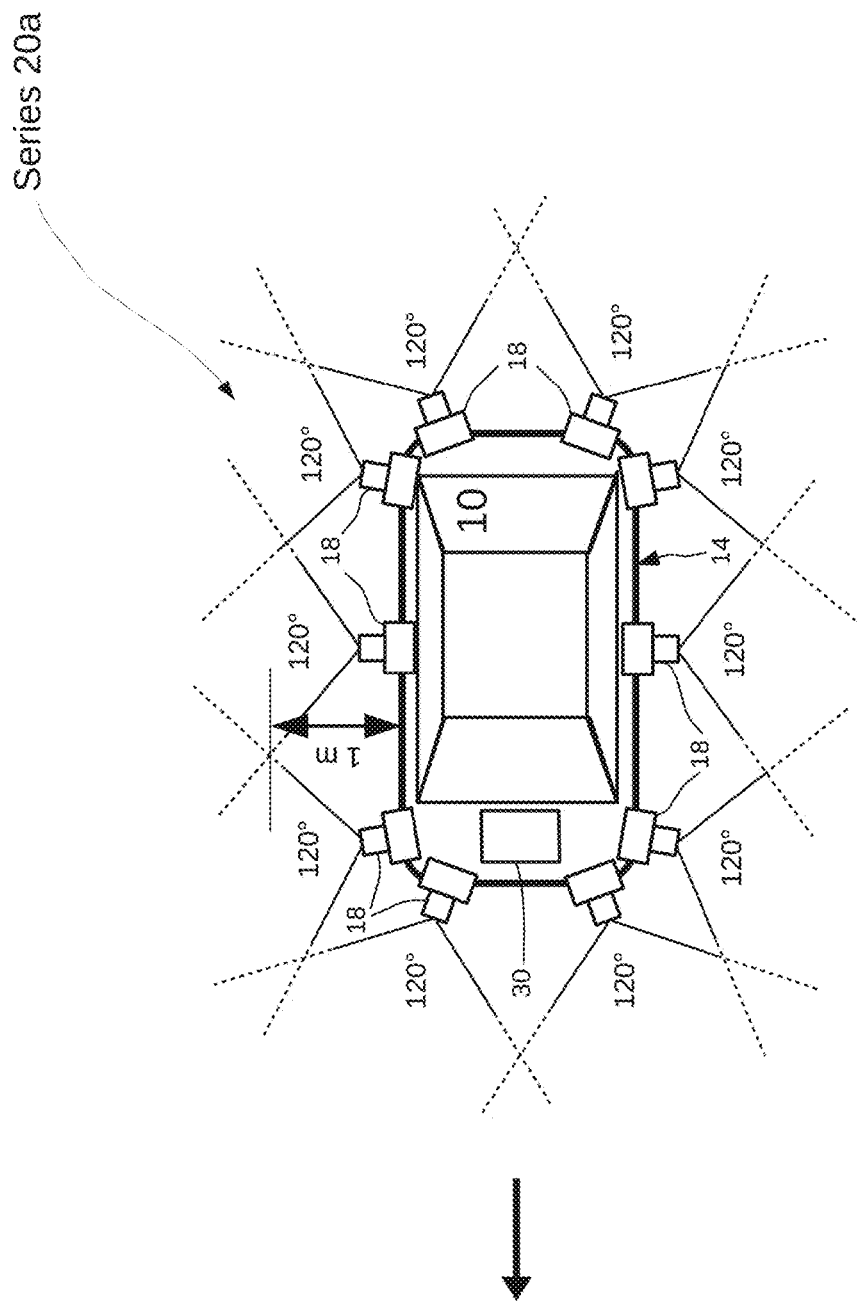

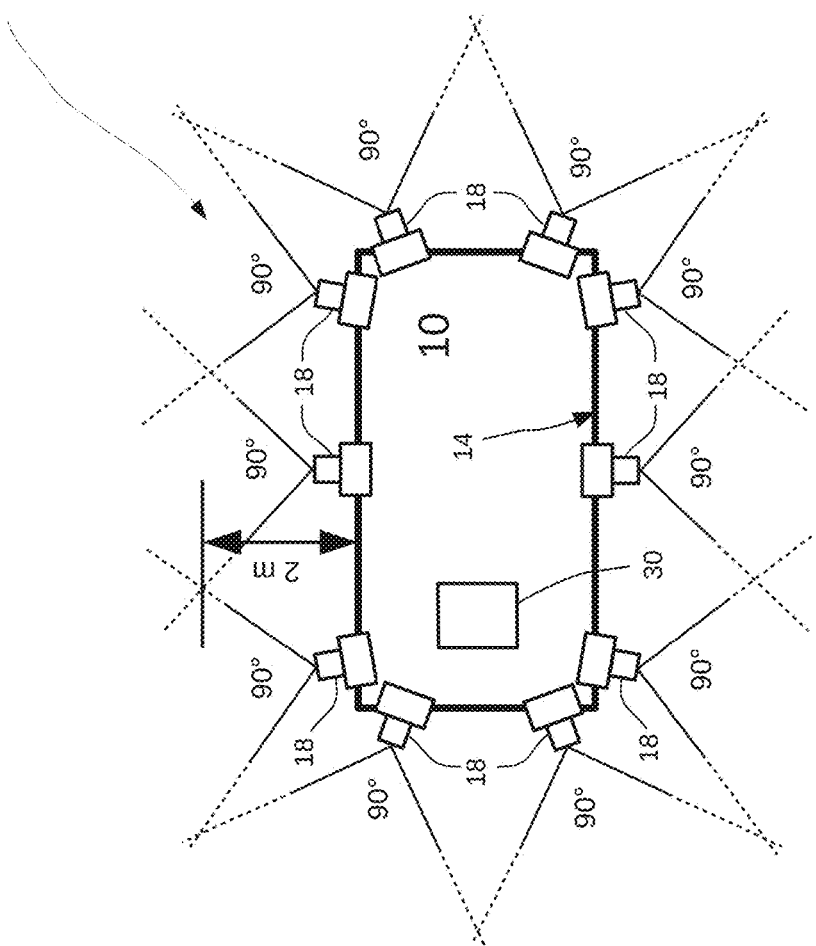

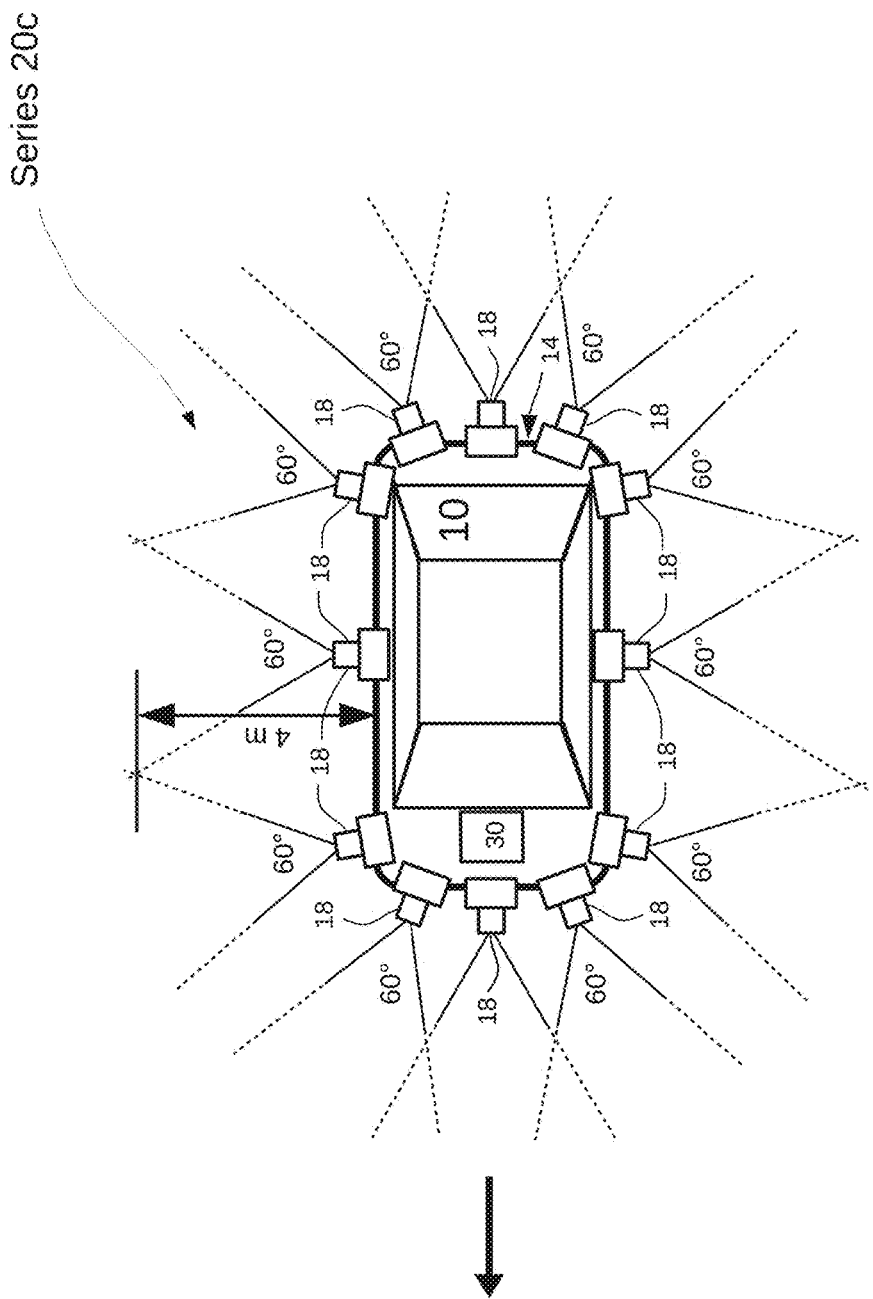

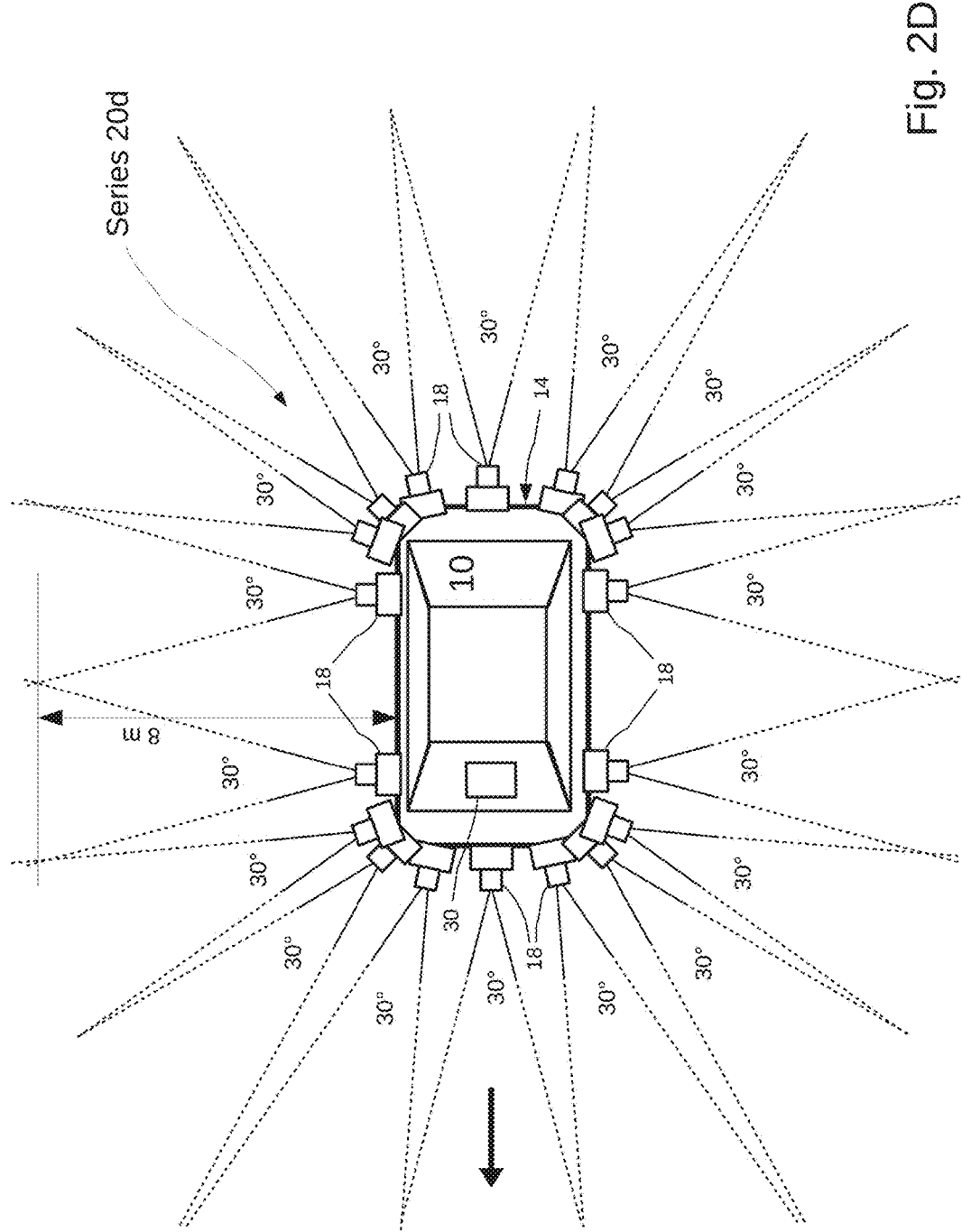

Camera Array

METHODS FOR DETECTING, IDENTIFYING AND DISPLAYING OBJECT INFORMATION WITH A MULTI-CAMERA VISION SYSTEM

RELATED APPLICATIONS

This application is related to U.S. Pat. Nos. 7,916,897, 8,170,294, 8,934,680; 8,872,887, 8,995,715, 8,385,610, 9,224,034, 9,242,602, 9,262,807, 9,280,810, 9,398,209 and U.S. patent application Ser. No. 13/862,372, filed Apr. 12, 2013, and U.S. patent application Ser. No. 14/971,725, filed Dec. 16, 2015, all assigned to the assignee of the present application and all of which are hereby incorporated by reference.

FIELD OF THE INVENTION

This invention relates to systems and methods for monitoring activity in a region surrounding a boundary or border. Embodiments of the invention provide real-time awareness of presence about a structure. In one example, a vision system monitors and displays roadway traffic activities about a moving vehicle.

BACKGROUND OF THE INVENTION

The demands for real-time situational awareness continue to expand from monitoring activities during emergencies, such as at the scene of a disaster, a terrorist activity, or a situation demanding emergency intervention by medical, police or fire personnel. These responses are often based on limited data sent from a single source, but for complex situations a range of more intensive data acquisition efforts are needed to monitor conditions and generate warnings of potential safety or security concerns. Statistically based applications which issue notifications or interrupts when a danger is imminent sometimes require multi-channel sensing followed by analyses such as object classification. Systems performing comprehensive monitoring often require generating multiple data types and may be tasked with reporting several fields of data (e.g., object type, position and movement or coordinate information) to reliably assess safety and security concerns. Providing more comprehensive performance in these systems can increase cost as well as complexity of both data acquisition and processing. This is especially true when large amounts of data must be acquired during short time intervals, e.g., fractions of seconds, and rapidly processed for visual displays or other forms of reporting media.

Use of vision systems in the field of highway traffic safety is illustrative of the need for more extensive data acquisition and comprehensive monitoring to rapidly react to unpredictable roadway dynamics. Existing vision solutions to increase awareness of vehicle surroundings have included combinations of cameras and other technologies (e.g., RADAR or LiDAR systems) to create dynamic maps of vehicle surroundings. LiDAR technology holds potential for achieving a comprehensive solution which combines multiple channels of both video and laser-based mapping data for self-driving vehicles. If the relatively high cost of Lidar systems declines significantly, this technology is more likely to be more widely deployed in automotive applications. Presently, assimilating and processing such high speed data rates for responses remains a costly challenge for self-driving vehicles, as rapid and reliable detection of surrounding activities is requisite for real-time response capabilities.

For driver-operated vehicles there is a need for lower cost sensing of nearby vehicles, pedestrians and traffic control signals to promptly generate warnings, enhance in-vehicle driver information, and even take control of a vehicle to avoid an accident. Information needed to make rapid assessments and interventions for vehicle safety requires rapid processing capability of large amounts of data from a relatively large number of sensors. Otherwise, issuing notifications and interventions to avert potential problems would be untimely or unreliable. It is often desirable to create a comprehensive awareness of vehicle surroundings, to avoid potential hazards, and to assure rapid response times for incident avoidance.

Generally, the cost of hardware that rapidly acquires and processes large amounts of data for real-time responses renders camera-based vision systems expensive, power consumptive and difficult to deploy in, for example, the automotive market. Simpler and lower cost solutions are needed to create vision systems which provide real-time responses for improved traffic safety.

SUMMARY OF THE INVENTION

In one series of embodiments a method is provided for identifying an object of interest in a zone of a region about a moving vehicle based on sizes of object images. A scene image is acquired in a different field of view for each in a series of at least two zones of the region about the structure. A first zone is relatively close to the structure and a second zone, separate and distinct from the first zone, extends farther away from the structure than the first zone. A first of the scene images is acquired with an image acquisition depth of field setting that sufficiently resolves an image of a first object positioned in the first zone for identification as a first object type with template matching criteria. An image of a second object of the first object type positioned in the second zone cannot be sufficiently resolved in the first of the scene images for identification as a first object type with the template matching criteria. A second of the scene images is acquired with an image acquisition depth of field setting that sufficiently resolves an image of a second object positioned in the second zone for identification as a first object type with the template matching criteria. An image of the first object of the first object type positioned in the first zone cannot be sufficiently resolved in the second of the scene images for identification as a first object type with the template matching criteria.

In one embodiment the first scene image subtends a first field of view angle and the second scene image subtends a second field of view angle. In another embodiment a first additional criterion requires, in order for the first object to be identified as an object of interest in the first zone, that the image of the first object be within a predetermined first range of sizes relative to the given size of the frame of image data based on the first field of view angle. The first additional criterion enables identification of images of objects positioned within the first zone.

The method may further include applying a second criterion to identify an image of the second object when present in a second of the acquired scene images as the first object type, while the second object is positioned in the second zone and the second scene image subtends a second field of view angle. The second criterion may require, in order for the second object to be identified as an object of interest in the second zone, that the image of the second object in the second of the acquired scene images be within a predetermined second range of sizes relative to the given size of the frame of image data based on the second field of view angle. The second criterion may enable identification of the image of the second object in the second scene image when the second object is positioned within the second zone based, in part, on size of the image of the second object in the second scene relative to the given size of the frame of image data based on the second field of view angle.

In a second series of embodiments, a method detects the presence of an object in a region extending above a surface and positioned beyond a border. The region includes at least first and second zones, each zone having a different spacing from the border. A frame of image data is acquired which spans a field of view angle corresponding to a portion of the region, from a position along the border. Object detection criteria are applied to analyze an image of an object in the frame of data. This includes application of a template matching process to classify the object among a set of object types. A determination is made whether the object is present in the first zone based on an effective application of a first series of scan windows, effectively varying in size over a first range of window sizes relative to the size of the image frame which first range of window sizes only permits detection of images limited in size to a first range of image sizes. A determination is made whether the object is present in the second zone based on an effective application of a second series of scan windows effectively varying in size over a second range of window sizes relative to the size of the image frame which second range of window sizes only permits detection of images limited in size to a second range of image sizes. In one embodiment the first range of scan window sizes and the second range of scan window sizes are each smaller in range than the range of a third possible series of scan window sizes which would permit detection of images varying in size over a third range of image sizes greater than each of the first range of image sizes and the second range of image sizes. The first range of scan window sizes and the second range of scan window sizes may be identical.

In another embodiment, the effective application of the first series of scan windows that effectively varies in size over the first range of window sizes is had by applying one scan window of a fixed size relative to a frame of image data having a predetermined number of pixels by down-sampling the number of pixels to provide smaller frames of image data relative to the one scan window of the fixed size. The effective application of the second series of scan windows that effectively varies in size over the second range of window sizes may be had by applying one scan window of a fixed size relative to the frame of image data having the predetermined number of pixels by down-sampling the number of pixels to provide smaller frames of image data relative to the one scan window of the fixed size. An object may be classified as an object type with parallel classifier cascades based on one or more of a Haar measure, local binary pattern features, a histogram of oriented gradients, and a census transform. The object types may include vehicles and pedestrians. The border may be a peripheral surface along a vehicle.

The frame of image data may be acquired with an imaging system providing the field of view angle along an optical axis. The position of the object may be determined based on position of the image of the object in the field of view relative to the optical axis and relative size of the image of the object to the frame of image data.

In a third series of embodiments a method displays position information of objects. Different identified objects are classified with different image acquisition devices. Each device includes a camera that captures an image of an object in a field of view having a field of view angle relative to an optical axis. The devices may also include a processing unit performing the classification according to object type. Each of multiple objects detected with at least one image acquisition device, optical information is used to determine position information for the object, relative to said at least one image acquisition device with which the object is detected. The position information may include (i) distance between the object and the at least one image acquisition device based on approximate size of the object image and (ii) angle of object image position in the field of view of the at least one image acquisition device. For each detected object, the position information of the object is transformed, relative to the position of the at least one image acquisition device, to revised position information based on a common reference position so that the position of each in the plurality of detected objects is defined relative to the common reference position. The position of each detected object is simultaneously displayed on a display screen. The method may include transforming the position information of each in the plurality of detected objects to the revised position information with computations performed by the image acquisition device which processes the acquired optical information. Prior to displaying the position of each detected object, the revised reference information acquired for each in the plurality of detected objects may be transmitted to a central control unit. The position of each detected object, based on the common reference position, may be presented by display of a selected icon. Selection of each icon may be based on application of a template matching engine to determine each object type.

DESCRIPTION OF THE FIGURES

Example embodiments of the invention are described by way of example with reference to the accompanying drawings in which:

FIGS. 2A-2D provide partial plan views of a series of image acquisition devices of the vision system;

Like reference characters denote like or corresponding parts throughout the figures. In order to emphasize certain features relating to the invention certain features shown in the figures are not drawn to scale.

DETAILED DESCRIPTION OF THE INVENTION

Figure 1A:
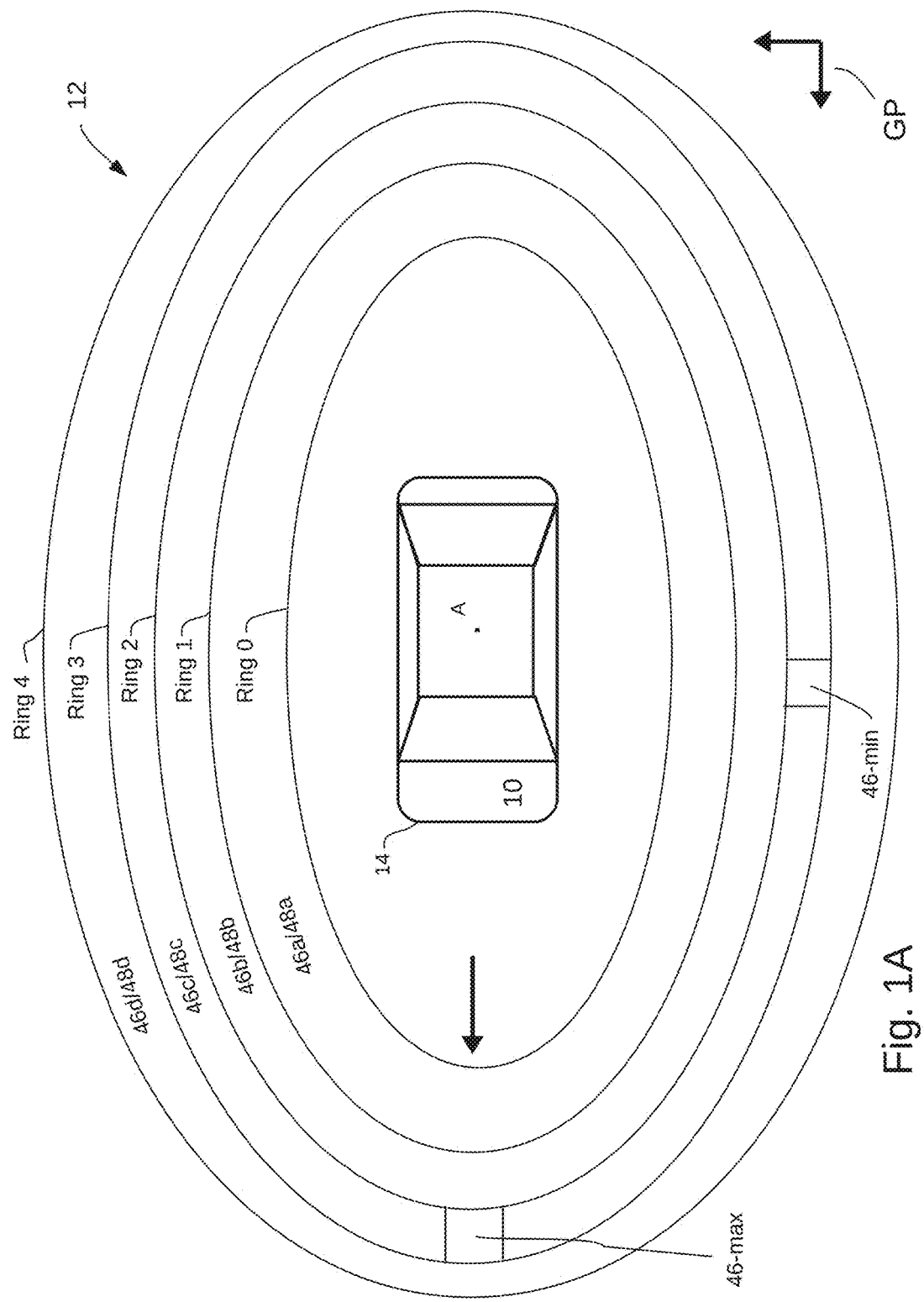
FIG. 1A is a plan view illustrating a series of vision zones about a vehicle in motion incorporating a vision system according to the invention.

Systems and methods for detecting objects, (e.g., pedestrians), as well as applications for such systems and methods are now described. Although specific details are set forth, embodiments of the invention may be practiced without these specific details. In other instances, well known structures and techniques have not been shown in detail in order not to obscure understanding of inventive features. Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily referring to the same embodiment. The particular features, structures, or characteristics may be combined in any suitable manner in one or more embodiments. Embodiments of the invention are facial orientations or poses applicable in a variety of settings in which it is desired to detect facial expressions in digital images.

In the context of motor vehicle safety, rapid detection and accurate identification of an object class are key to developing timely situational awareness based on image acquisition. A vehicle vision system must detect other vehicles and pedestrians but, to be more effective, it may be necessary to classify according to subcategories of object types. Given a class which generally includes moving persons, there may be several distinguishable object types which require different detection criteria to be identifiable. For example, an ambulatory person may be a pedestrian pushing a baby carriage, using a cane or walker and, more generally, a moving person may be riding a bicycle or a skateboard. To the extent more classification details can be acquired, the user becomes more capable of responding to a sudden presence of the person in the safest manner.

Vehicular vision systems typically transmit video data from a limited number of camera units mounted along a vehicle exterior surface to a central processing and display unit. To satisfy demands for timely awareness of traffic situations, embodiments of the invention combine multiple video image acquisition devices that locally process image data and generate object detection and classification data. Based on object detection and classification data, the devices monitor changes in pedestrian and vehicle activities. Positions of moving object types are overlaid on separately acquired map data, descriptive of static surroundings, to generate a dynamic traffic map. The object information is acquired by applying detection algorithms to image data with application of template matching algorithms to variable sized scanning windows. See U.S. Pat. No. 8,934,680, "Face Tracking For Controlling Imaging Parameters" to Corcoran, et al.; and U.S. Pat. No. 8,995,715 "Face or Other Object Detection Including Template Matching" to Sultana, et al. See, also, U.S. Pat. No. 9,242,602, "Rear View Imaging Systems for Vehicle" to Corcoran, et al., incorporated herein by reference.

In example applications, multiple cameras in a vision system 8 simultaneously capture portions of a field of view to collectively provide image data over a scene in a region about a structure. The illustrated structure about which the fields of view are captured is a moving vehicle. More generally, the vision system 8 provides overlays of object information for images acquired about stationary or mobile structures or about a perimeter, a boundary or other form of border for enhanced situational awareness in a region monitored with multiple imaging devices.

The term "field of view" is used in the context of a surface, a boundary or other form of border, and is based on an angle subtended there along, through which optical information is received. The term "border" refers to a demarcation that distinguishes a zone from another portion of a region. A surface on a structure and a boundary may each be a border. A field of view may be based on the view acquired with a single imaging device or may be based on a composite of views associated with multiple imaging devices positioned along different portions of a border.

The term "field of view angle" refers to a particular portion of a total viewing angle, for a single image or for a composite image, along a border through which optical information is received, e.g., by a single image acquisition, or multiple image acquisition devices. Field of view angle may refer to a particular portion of a total solid angle about the structure through which optical information is received based on a selected position of an optical axis or plural optical axes along the structure surface. Two lens imaging systems, each having identical characteristics and settings, including the same field of view angle through which optical information is received, may provide two different fields of view based on differences in position or orientation in the optical axis of each.

Referring to the example embodiment of FIG. 1, the vision system 8 is installed on a moving vehicle 10 to monitor activities in a region 12 which extends along a ground plane GP and about the vehicle. Imaging devices positioned along a peripheral surface 14 of the vehicle acquire and process video data of a scene in the region to generate object detection information, including icons 15 corresponding to classified objects. The object detection information is overlaid on a real-time map display without requiring high speed transfer of video data between image acquisition components and a visual display. The system architecture incorporates an ISO 15765 compliant Controller Area Network (CAN) bus 16 shown in FIG. 1C with a plurality of image acquisition devices, each operating as a CAN bus node. Other relatively low speed signaling protocols, e.g., 1 Mbps, are also suitable, providing advantages of simplicity and flexibility over higher data rate network cables.

In the partial plan views of FIGS. 2A through 2D, a plurality of image acquisition devices 18 in the vision system 8 are shown mounted along the peripheral surface 14. The image acquisition devices 18 are grouped in four exemplary series 20a-20d where devices 18 in each series generate video information for a different image detection zone 46a, 46b, 46c, 46d in a sequence of detection zones extending away from the vehicle. See FIG. 1A which illustrates the detection zones 46 as elliptical in shape, while other shapes may be desirable. The shapes vary as a function of factors such as depth of focus and selection of scan window size for each device.

Each image acquisition device 18 comprises a camera 22 which continuously acquires image frame data over a field of view (FoV) at, for example, 28 to 30 fps. For purposes of illustration, a limited number of the image acquisition devices 18 in each series 20 are shown in the figures, it being understood that the actual number and positioning of image acquisition devices 18 in each series 20 will vary, based on object detection specifications for the vision system 8.

Figure 1B:
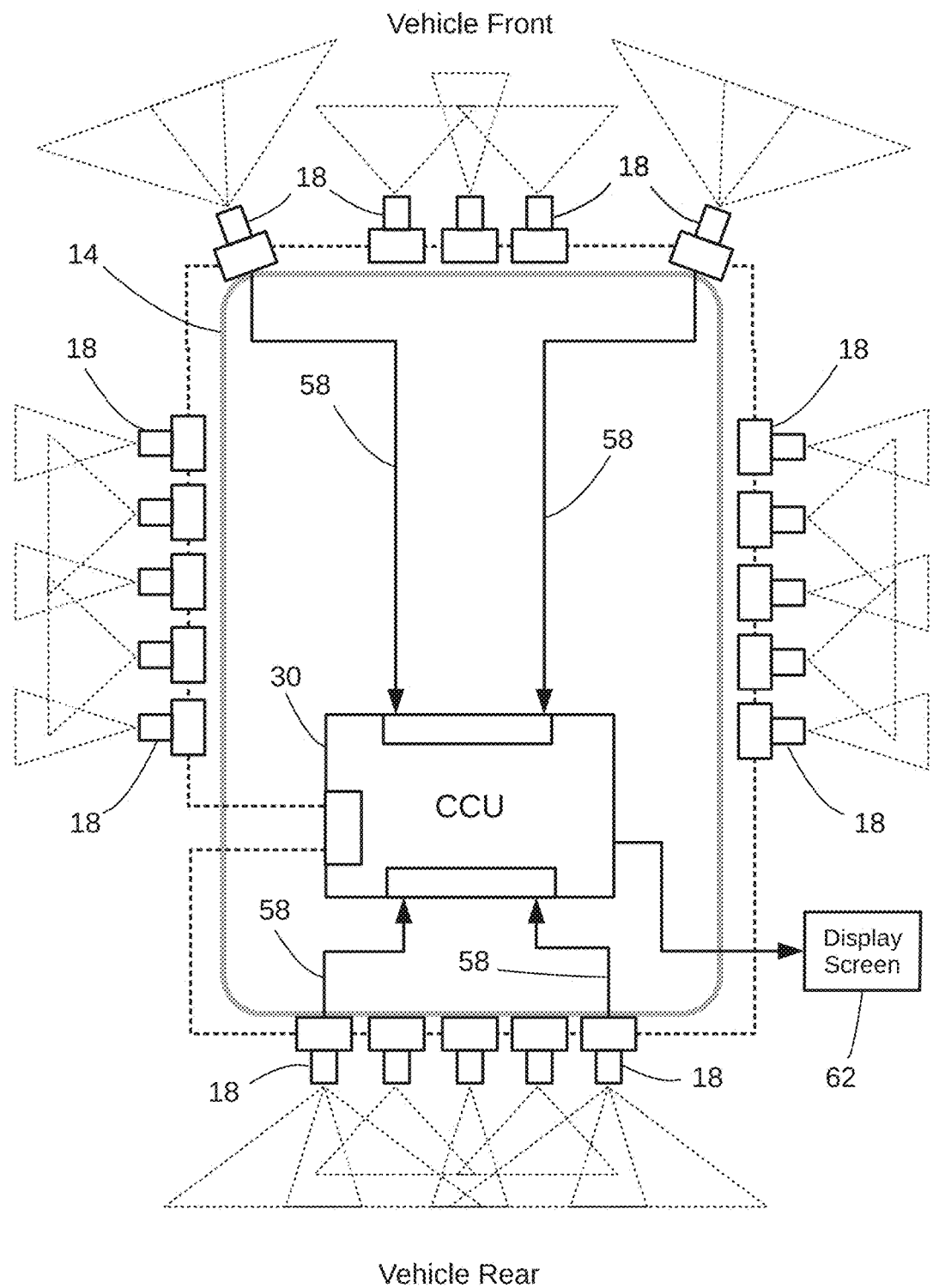
FIG. 1B is a partial schematic view of an embodiment of the vision system.
Figure 1C:
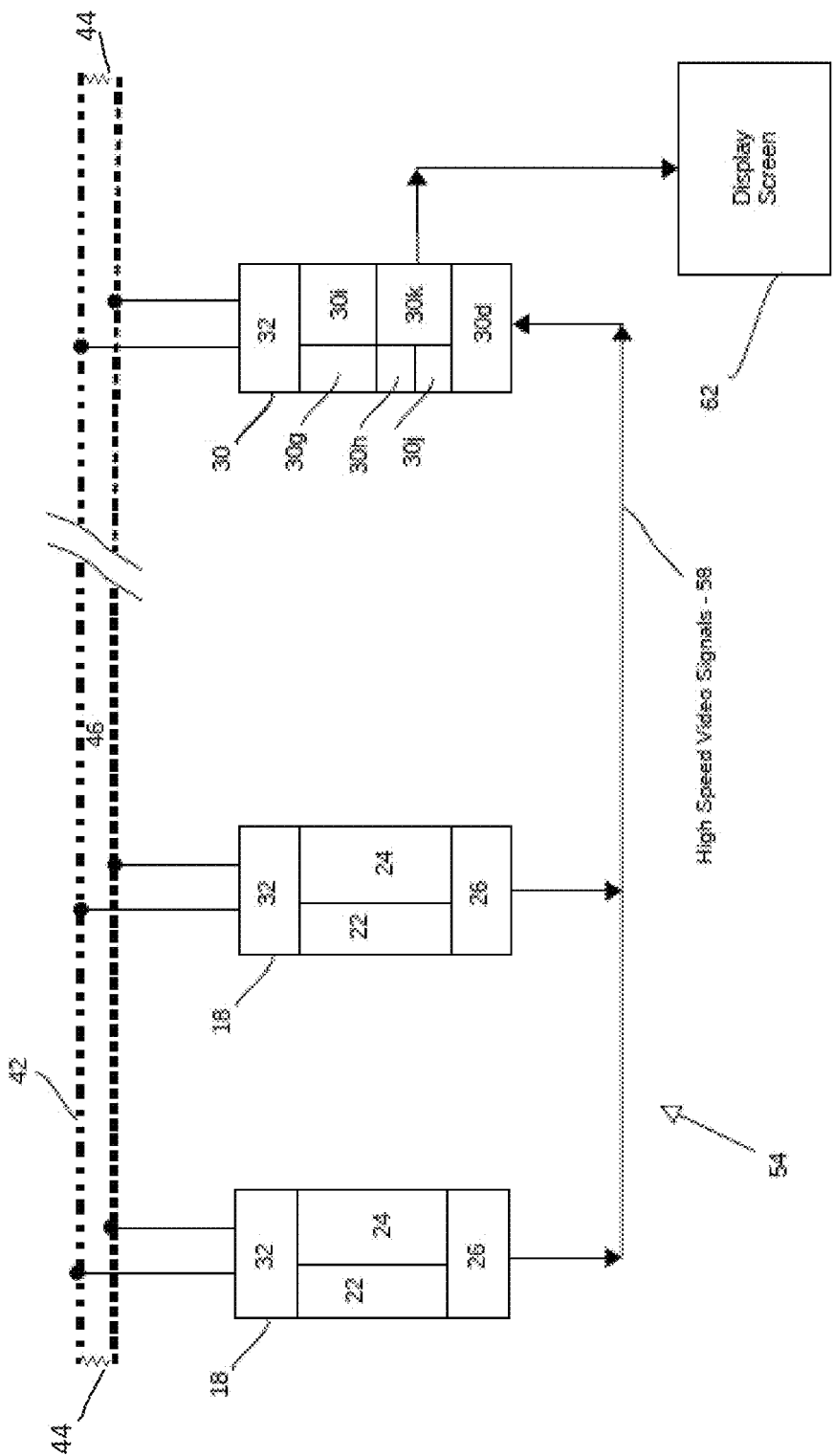
FIG. 1C is a partial schematic view of an exemplary network architecture for the vision system of FIG. 1B.
Figure 1D:
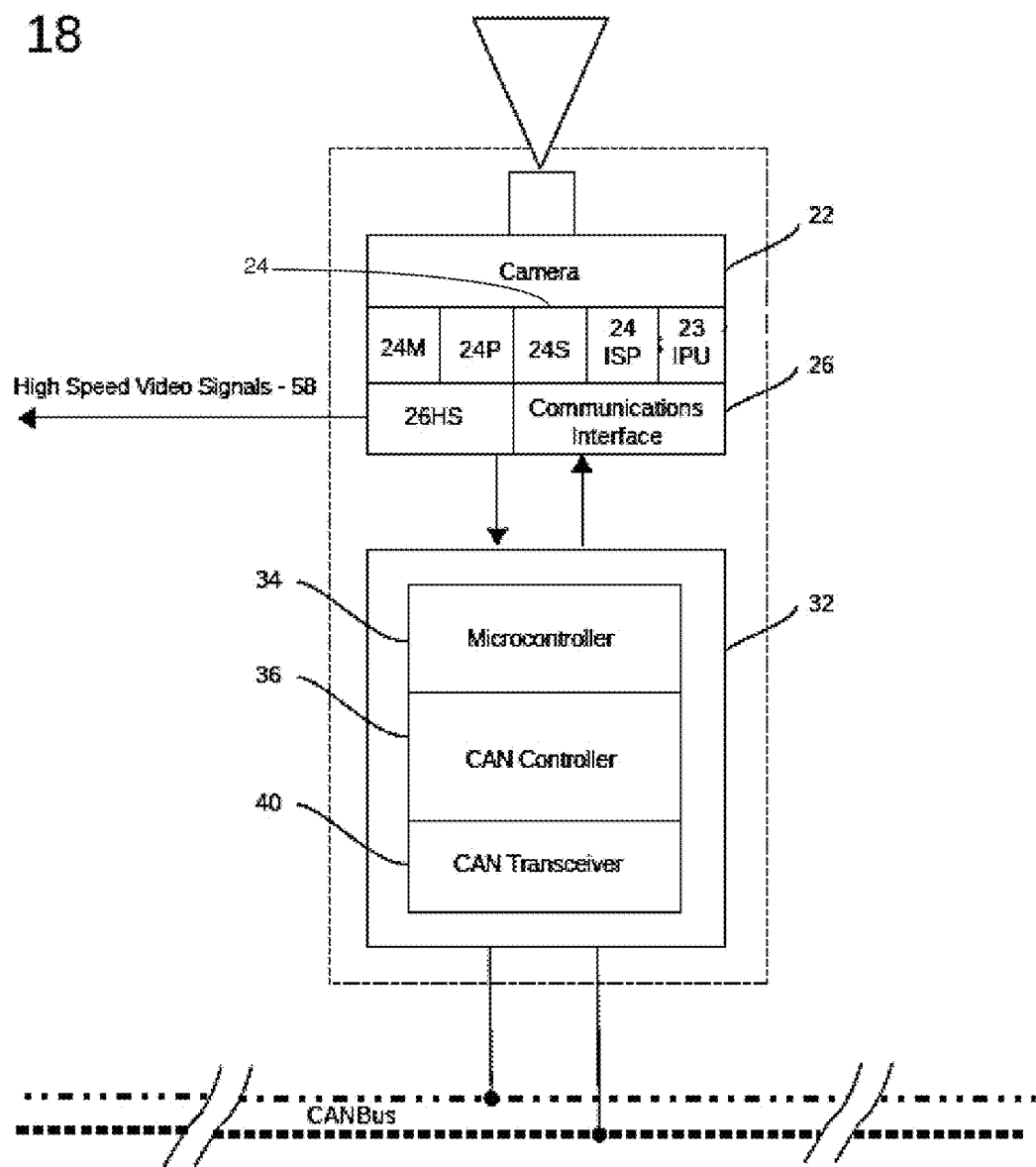
FIG. 1D illustrates features of an exemplary image acquisition device of the vision system.

FIG. 1D illustrates an exemplary hardware configuration for the data acquisition devices 18. In addition to the camera 22, each device 18 comprises an Image Processing Unit (IPU) 23 connected to receive the raw camera image data (which may be Bayer pattern image data); a computer processing unit (CPU) 24 which controls camera settings and bus communications, and a data communications interface 26. The CPU 24 comprises a programmable processor 24P, an image signal processor 24ISP, memory 24M and storage 24S. Memory 24M may be a multi-port device accessed by the IPU 23, the CPU 24 and the image signal processor 24ISP. Prior to passing the image data to the IPU 23, the image signal processor 24ISP performs demosaicing, to reconstruct a full color image, and other pre-processing activities, including noise reduction and image sharpening. In other designs, the IPU 23 may incorporate functions of the image signal processor 24ISP.

In one embodiment, the exemplary image acquisition devices 18 may be formed in a simple, low cost package, with a module comprising a fixed focus camera 22, CPU 24 and conventional image signal processor 24ISP. The module is combined with the IPU 23 and the data communications interface 26 to form a compact unit for mounting along the vehicle peripheral surface 14. The devices may incorporate optics for variable ranges of focal depth at selected focus distances. In other embodiments, devices 18 are formed in an array unit 18AU comprising a central processing unit which accelerates processing of data for multiple device cameras 22 to achieve speeds of object identification and classification consistent with frame rates of 28-30 fps.

Figure 1E:
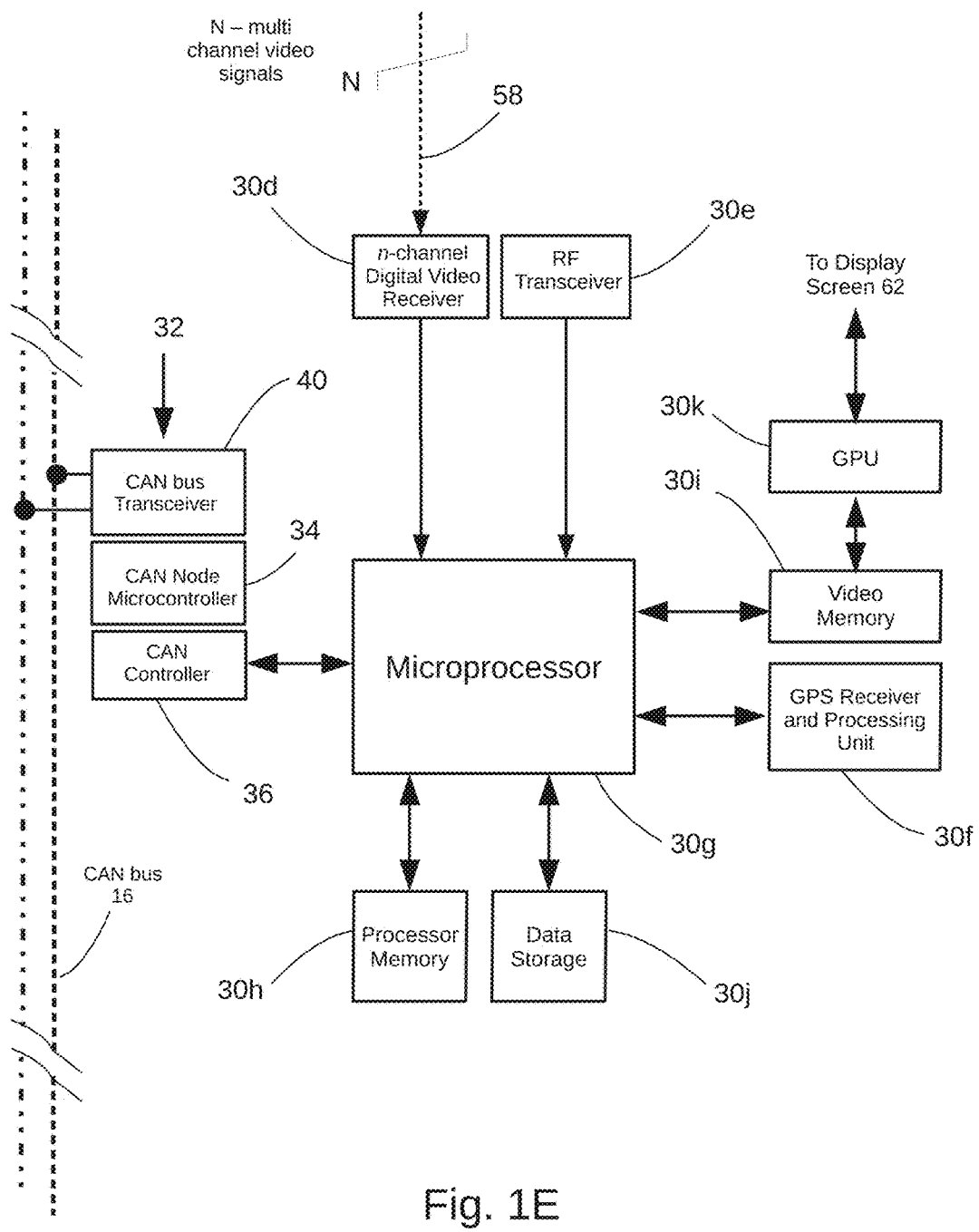
FIG. 1E is a simplified block diagram illustrating numerous functional components of a central control unit in the vision system of FIG. 1C.

Referring to FIGS. 1B and 1E, the devices 18 are connected to transmit data via the CAN bus 16 between a Central Control Unit (CCU) 30 and components of each image acquisition device 18, including the IPU 23 and the device CPU 24. In other implementations, the data would be transmitted via Media Oriented Systems Transport (MOST) technology, Ethernet protocol or plastic optic fibre. The devices 18 also receive instructions from the CCU 30 to make changes in, for example, camera settings and orientations. To effect the network data communications each image acquisition device 18 includes conventional CAN bus circuitry 32 comprising a CAN microcontroller 34, a CAN controller 36 and a CAN transceiver 40 separate from the data communications interface 26. The CAN transceiver 40 converts data streams between CAN bus levels and CAN controller levels. Similarly, the CCU 30 operates as a CAN bus node with circuitry 32 comprising a CAN microcontroller 34, a CAN controller 36 and a CAN transceiver 40 to convert data streams between CAN bus levels and CAN controller levels.

The CAN bus as illustrated in FIG. 1C has a linear bus topology having a two-wire cable 42 with resistive terminations at two linear end points 44 and nodal connections between the cable 42 and each data communications interface 26 of the devices 18 and the CAN transceiver 40 in the CCU 30. The network may be based on other bus topologies (e.g., a ring network). In addition to providing for operation as a CAN node, the data communications interface 26 of each device 18 may include wireless connectivity for receipt of command signals or to provide an alternate path for data transfer (e.g., using 802.11 or Bluetooth protocol), or other types of wired data connections including video transmission between device cameras 22 and a receiver in the CCU 30.

Figure 5:
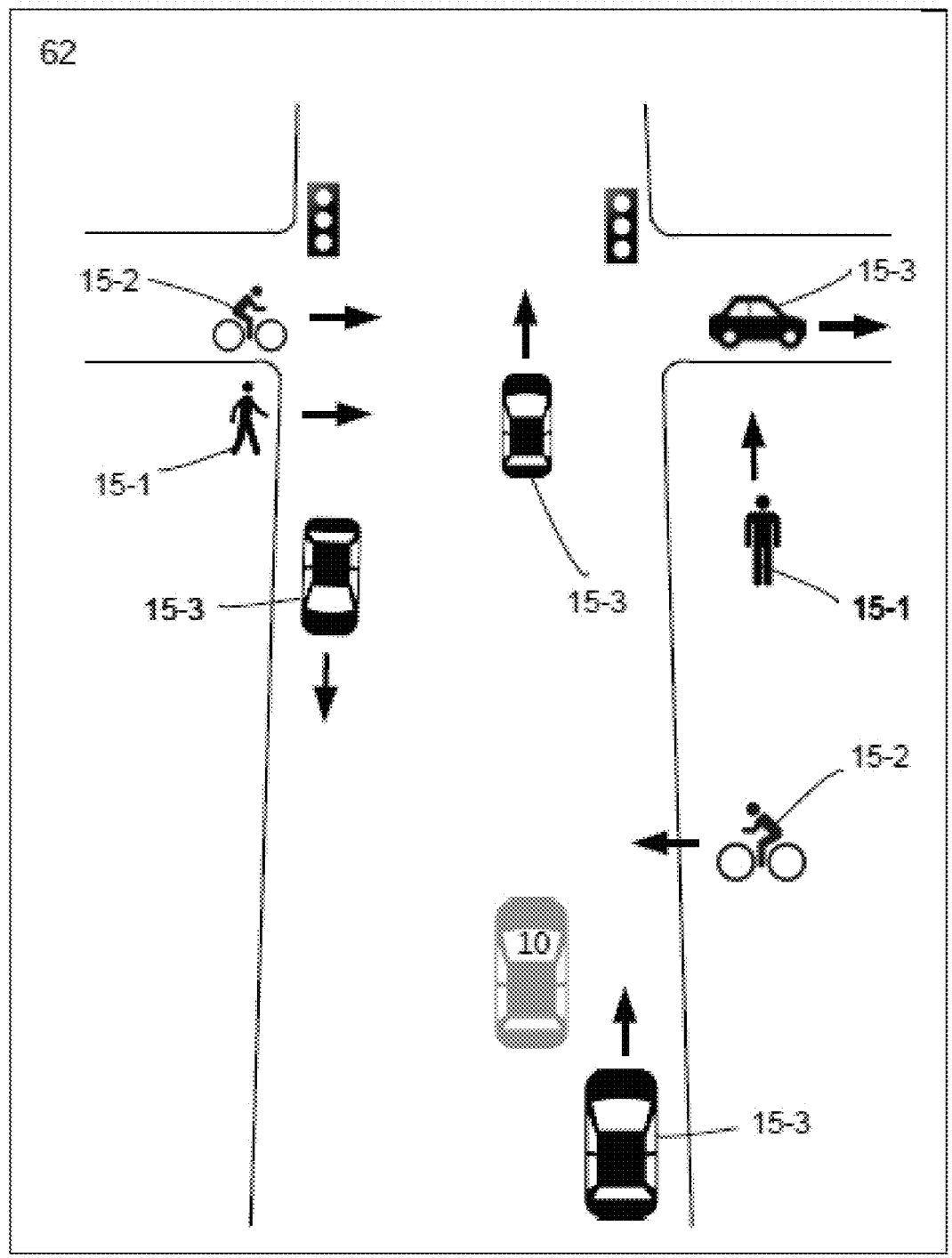
FIG. 5 illustrates a display screen showing positions of icons, corresponding to moving object types detected with the vision system. The icons are overlaid on a street map with which the vision system also displays position of the vehicle shown in FIG. 1A.

Still referring to FIG. 1E, the CCU 30 comprises a multi-channel digital video receiver 30d, rf transceiver 30e, GPS receiver and processing unit 30f, programmable microprocessor 30g, microprocessor memory 30h, video memory 30i, and data storage 30j containing data and executable software which runs on the microprocessor 30g. The microprocessor 30g receives: object identification and location data over the CAN bus 16 from the image acquisition devices 18; N multi-channel digital video signals on demand from selected ones of the image acquisition devices 18 via cables 58; map information from a Global Information System (GIS) via transceiver 30e; and vehicle position information from the GPS receiver and processing unit 30f. The microprocessor 30g selects between receipt of object identification and location data sent over the CAN bus 16 and the digital video signals sent on cables 58 from the image acquisition devices 18. Applying vehicle location information provided by the GPS receiver and processing unit 30f, the microprocessor 30g assimilates the map information into a time varying plan view of the region 12 about the vehicle 10, showing roadway intersections and the position of the moving vehicle relative to the surroundings. Applying object classification and location data received over the CAN bus, the microprocessor 30g overlays icons 15 of detected objects on the plan view of detection zones 46 in the region 12 surrounding the vehicle. See the exemplary display screen of FIG. 5 which illustrates pedestrians 15-1, a cyclist 15-2, and vehicles 15-3 traveling in several directions.

For the example shown in FIGS. 2A through 2D, the fields of view captured by each series of cameras covering a detection zone are designed for continuous monitoring of an entire 360° field of view about the vehicle 10. To this end, the vertices of field of view angles are rotated along the ground plane GP for some of the cameras 22 in each series, e.g., for cameras adjacent rectangular corner areas of the illustrated vehicle 10. This select rotation provides overlap in fields of view acquired by adjacent cameras. The overlap can result from rotation of a physical camera module or by rotation of the lens so that the resulting rotated optical axis would not be normal to the peripheral surface 14, while the optical axes of other device cameras 22 in the series 20 are normal to the peripheral surface 14. FIG. 2E illustrates presence of gaps, G, between individual 90° camera fields of view angles about the vehicle 10 when all of the optical axes are normal to the peripheral surface 14. Determinations of the degree of overlap in adjoining fields of view in a series 20 of image acquisition devices, and the degree to which an optical axis is not normal to the surface 14, are optical considerations when designing the vision system 8 for specific applications.

By creating overlap in adjoining fields of view of adjacent cameras 22, the vision system 8 can assure capture of a continuous field of view about the vehicle 10 but, in some instances, the design may permit gaps, G, between fields of view of adjacent cameras in a series, such as when performing limited field of view monitoring on individual sides of a stationary structure. However, in vehicle applications of the vision system, safety considerations may warrant monitoring a continuous or full 360° field of view about a perimeter with multiple camera fields of view. This can avoid blind spots, provide more comprehensive identification of objects and more accurately update object position information. Provision of relatively wide field of view angles assures overlap when acquiring image information relatively close to the device cameras 22. Embodiments of the invention provide a combination of device cameras having different field of view angles in different ones of the series 20 of image acquisition devices 18, and device cameras in the same series 20 may have different field of view angles to acquire continuous coverage about the vehicle 10 or to facilitate detection of object types. When device cameras in the same series 20 acquire images with different field of view angles, the CCU 30 may digitally adjust fields of view between acquired images.

Figure 2E:
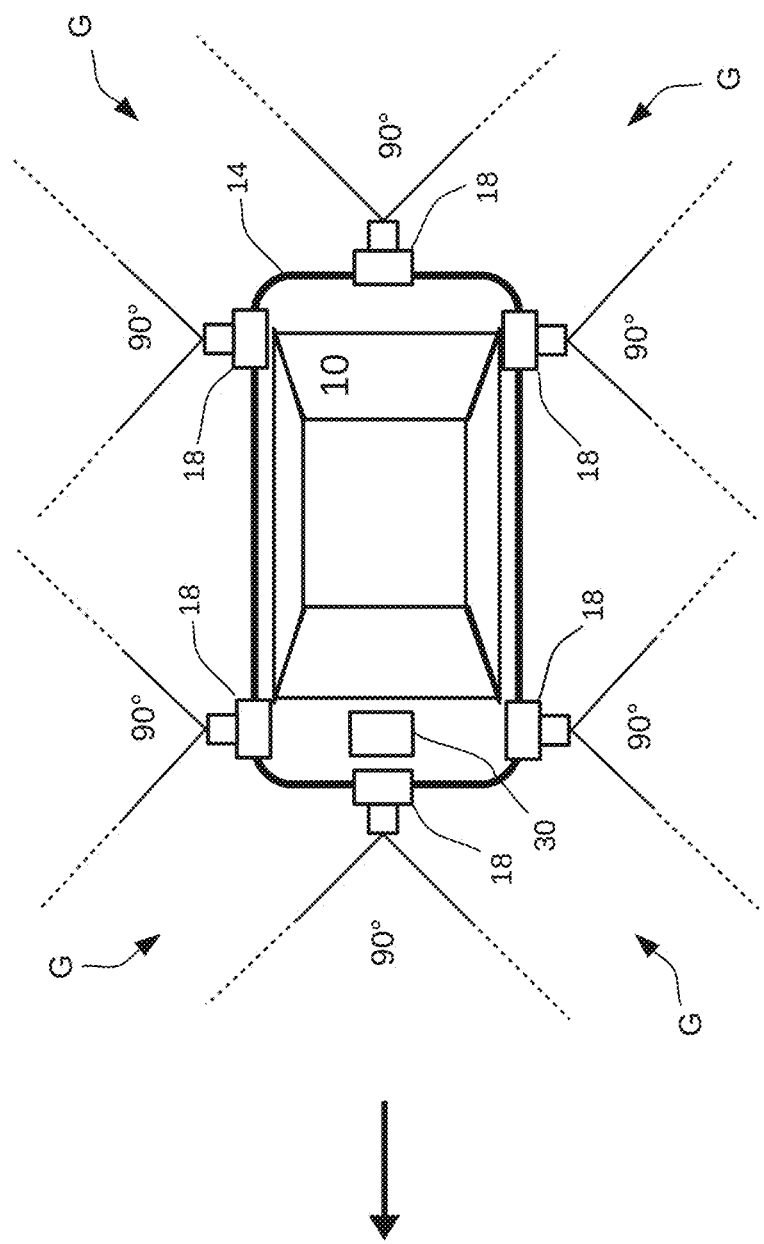
FIG. 2E illustrates an arrangement of image acquisition devices which allow gaps between the fields of view acquired by adjacent device cameras.
Figure 2F:
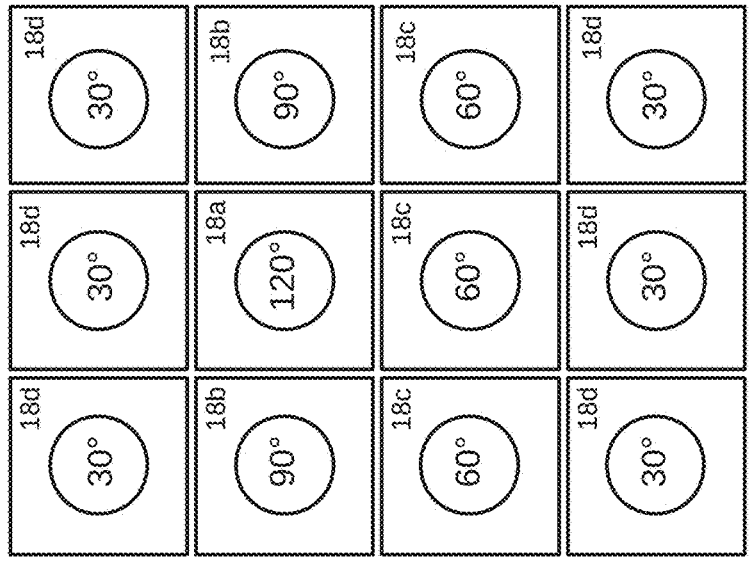
FIG. 2F illustrates a two-dimensional array unit comprising a plurality of image acquisition devices according to an alternate implementation of the system shown in FIG. 1.
Figure 2G:
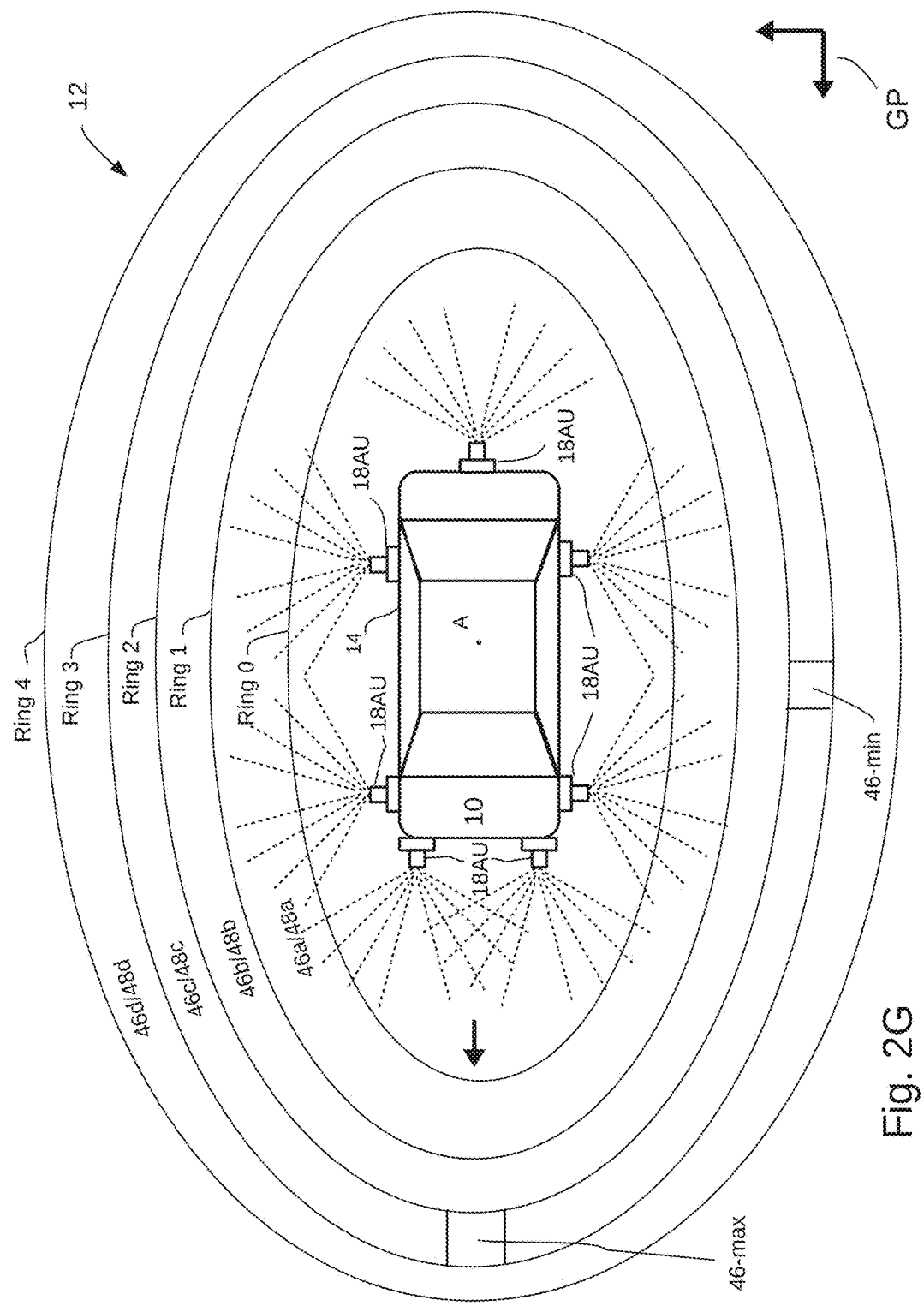
FIG. 2G illustrates a series of the image array units distributed about the peripheral surface of a vehicle.

FIG. 2F illustrates a two dimensional unit 18AU comprising twelve image acquisition devices 18 arranged in a 3×4 array. Image acquisition devices 18 configured with different camera field of view angles are referenced as devices 18a through 18d. The field of view angles are adjustable by the CCU 30. Each device 18 is assigned to or is programmably assignable to one of the four series 20a-20d by the CCU 30. FIG. 2G illustrates a sequence of seven array units 18AU distributed about the vehicle 10 with individual ones of the devices 18a, 18b, 18c and 18d assigned to a series 20. In this example, in each array unit 18AU one device 18a covers a 120° field of view; two devices 18b cover a 90° field of view; three devices 18c cover a 60° field of view and six devices 18d cover a 30° field of view. The combined field of view of the six 30° devices 18d, the combined field of view of the three 60° devices 18c, the combined field of view of the two 90° field of view devices 18b and the combined field of view of the single 120° field of view device 18a each cover similar composite fields of view along directions parallel to the ground plane GP, subject to variations due to overlap in individual fields of view. In this example, image acquisition devices in different array units 18AU, which have the same field of view angle (e.g., all of the devices 18a), are assigned to the same series (e.g., series 20a).

Each image acquisition device 18 includes a set of object detection sensitivity variables, the values of which are selectable for the portion of a detection zone to which the device is assigned. The CCU 30 may control selection of values for the object detection sensitivity variables to optimally detect, classify and determine position of an object. Object detection sensitivity variables include camera optical and speed settings, including field of view angles, and the range of scan window sizes applied for detection and classification. The variables can be optimized for detecting objects positioned within predefined ranges of distance between each detection zone 46 and the vehicle 10. Each detection zone 46 may have asymmetric (e.g., elliptical) shapes requiring variable focus settings, field of view angles and scan window sizes for different positions about the zone. The variations are due, in part, to differing distances between each device camera 22 in a series and the portion of a detection zone 46 being monitored. The devices 18 may each have a set of fixed object detection sensitivity values, or the values may be programmably varied by the CCU 30 to alter, for example, shapes of detection zones 46.

The term focus region refers to a region having a depth of focus extending between inner and outer rings defining a detection zone 46. The term focal distance range refers to a depth of focus extending over a range of distances relative to the position of a camera lens, the peripheral surface 14, or a point on the vehicle 10.

Referring to FIG. 1A, device cameras 22 in the series 20a collectively create a focus region 48a primarily in detection zone 46a, bounded by Ring 0 and Ring 1, and extending up to 2 m from the peripheral surface 14. Device cameras 22 in the series 20b create a focus region 48b primarily in detection zone 46b bounded by Ring 1 and Ring 2, extending between 2 m and 4 m from the peripheral surface 14. Device cameras 22 in the series 20c create a focus region 48c primarily in detection zone 46c bounded by Ring 2 and Ring 3, extending between 4 m and 8 m from the peripheral surface 14. Device cameras 22 in the series 20d create a focus region 48d primarily in detection zone 46d bounded by Ring 3 and Ring 4, extending beyond 8 m from the peripheral surface 14 to infinity. With adjustable camera optics to control focal depths, each of the focus regions 48 created by a series 20 of cameras 22 can be controlled to align with or reside primarily within one detection zone 46, but with limited optical adjustment capabilities. When the focal depths of cameras assigned to a zone extend beyond the zone, thereby rendering objects outside the zone in focus, detection and classification of objects beyond the zone can be avoided by limiting the series of scan windows to sufficiently large sizes that will not detect the relatively small images of such objects.

According to one series of embodiments, device cameras 22 in different ones of each of the four series 20a-20d define different focal distance ranges. Each range extends over a focus region 48 associated with a different image detection zone 46 for which the cameras in the associated series acquire image data. In one embodiment, device cameras 22 in the same series 20 are assigned the same field of view angles to meet criteria for detecting a minimum size object positioned in the associated zone 46. Cameras in series 20a provide field of view angles of 120°. Cameras in series 20b provide field of view angles of 90°. Cameras in series 20c provide field of view angles of 60°. Cameras in series 20d provide field of view angles of 30°. These field of view angles and disclosed ranges in the field of view angles are exemplary and are not limiting.

In one embodiment of the vision system 8, for the detection zones 24 illustrated in FIG. 1A, the device cameras 22 in different ones of the series 20a-20d provide scene images at different field of view angles and the cameras 22 in the same series 20 provide scene images at the same field of view angles. Other embodiments of the invention are not so limited.

For a given object size in the vision system 8, the camera field of view angles within each detection zone 46 are chosen to limit maximum distance of object detection. For the vision system 8, as the focal distance ranges increase from inner zones to outer zones in the sequence of detection zones 46, the field of view angles of cameras in the detection zones 46 generally decrease. Minimum image size criteria for object detection in each zone are based on this inverse relationship. Accordingly, the detection zones 46 are an ordered sequence based on the attribute of decreasing field of view angles as a function of increasing distance from the peripheral surface 14. Generally, for each device 18, detection size criteria for imaged objects may be based on the solid angle subtended by the image as a function of distance from the associated camera 22, relative to the camera field of view angle. Detection size criteria may also be based on pixel dimensions of object images as a function of distance from the associated camera 22, relative to scan window pixel size.

When the field of view angle remains constant while viewing an object over a focal distance range extending 2 m to infinity from a device camera 22, the image of a given size object subtends a progressively smaller angle in the field of view as the distance of the object from the camera increases from 2 m. When the image of the object occupies a smaller portion of an image frame it becomes necessary to apply smaller scan windows to detect or characterize the image for purposes of classifying the object. A feature of certain embodiments of the invention is to constrain the range of scan window sizes so as to exclude smaller size scan windows in particular zones (e.g., detection zones 46a, 46b and 46c). This precludes detection in closer zones of an object image when the object is positioned in a more distant zone. By eliminating object detection and classification with small scan window sizes by those image acquisition devices 18 assigned to zones closer to the vehicle 10, relatively small images of objects positioned in more distant zones are not classified by the cameras assigned to the closer zones. Instead, cameras assigned to perform object detection and classification in a zone more distant from the vehicle 10 are provided with a narrower field of view to detect and classify the images of the more distant objects while the same, albeit smaller, object images are not detected in the closer zones because of the limited range of scan window sizes applied in the closer zone. This feature provides the added benefit of avoiding use of small scan windows which require relatively large amounts of computation. In one embodiment, object detection and classification is efficiently performed in multiple image detection zones 46 with only the five largest scales of scan windows.

For the illustrated examples, device cameras in a first detection zone 46a in the sequence, closest to the peripheral surface 14, have relatively wide field of view angles and may have relatively short focal distance ranges to detect and classify objects present at relatively close distances to the peripheral surface 14 (e.g., at a focal range up to 2 m); and each subsequent detection zone 24 in the sequence is formed with cameras 22 having progressively narrower field of view angles and which may have progressively longer focal distance ranges. This facilitates detecting and classifying objects present at increasing distances from the peripheral surface 14 using only the largest scales of scanning windows.

Advantageous embodiments apply progressively smaller camera field of view angles and progressively larger focal distance ranges in object detection zones positioned at progressively larger distances from the peripheral surface 14. As distance from the peripheral surface increases, this combination both (i) increases the sizes of object images relative to the captured frame of image data and (ii) limits the focal distance range in each focus region 48. Limiting the focal distance range in each focus region 48 facilitates limiting object detection with the device cameras in one series 20 to the objects positioned in the detection zone 46 which the specific series of devices 18 is intended to cover. Moreover, for a given object detection size criterion:

(a) providing relatively wide field of view angles with a series of device cameras 22 having a depth of field extending from 2 m beyond the peripheral surface 14 (e.g., the devices 18 in the series 20a) in a zone relatively close to the peripheral surface 14 (e.g., detection zone 46a), can provide suitable image sizes in the field of view to detect objects meeting the detection size criterion; while (b) providing relatively narrow field of view angles with a series of cameras 22 having a depth of field extending from 8 m beyond the peripheral surface 14 (e.g., devices 18 in the series 20c) in a zone relatively far from the peripheral surface 14 (e.g., detection zone 46c) can sufficiently enhance image sizes in the narrow field of view of objects which also meet the object detection size criterion; but which are more distant from the peripheral surface 14 such that they cannot be detected with cameras associated with the zone relatively close to the peripheral surface 14, i.e., having the relatively wide field of view angles.

Generally, by imaging regions in more distant detection zones 46 with smaller field of view angles, it is possible to render larger images of distant objects relative to the camera field of view, and more efficiently and accurately analyze the images of relatively distant objects to classify the images among object types with fewer scan window operations per device 18. When the device cameras in the zones more distant from the vehicle 10 have smaller field of view angles, a larger number of cameras 18 are required to synthesize a full 360° field of view, due to both the smaller field of view angles and the larger number of overlapping fields of view.

The field of view angles of cameras in a particular detection zone 46 determine how close to the vehicle 10 the vision system 8 can acquire overlapping camera fields of view to identify objects over a continuous field. Objects farther from the peripheral surface-14 are identified and distinguished with a relatively large number of cameras each having relatively narrow field of view angles, while objects positioned closer to the peripheral surface 14 are identified and distinguished with a fewer number of cameras each having relatively wide field of view angles. For example, with the 90° field of view angles for cameras shown in FIG. 2B for the series 20b, the spacing between cameras is set to provide overlapping fields of view to detect and classify a given size object at a minimum distance of 2 m and up to a 4 m distance from the peripheral surface 14. At the same time, device cameras 22 of FIG. 2B, having 120° field of view angles in the series 20a are arranged to provide overlapping fields of view to detect and classify an object of the same given size at a minimum distance of 1 m distance from the peripheral surface 14 and up to at least a 2 m distance from the peripheral surface 14.

For each detection zone 46, the vision system 8 can provide a continuous field of view of arbitrary size, up to a 360° field of view angle. When a continuous field of view is desired for a scene in the region 12, the optimal number of device cameras 22 providing overlapping fields of view, to monitor for the presence of objects completely around the vehicle 10, depends on the size of the vehicle, the distance of the detection zone 46 from the peripheral surface 14, the chosen field of view angles for each device camera 22 and the degree of overlap between fields of view captured by different cameras 22. When cameras in the same detection zone 46 have varied or adjustable fields of view or adjustable orientations of the optical axes, changes in values of object detection sensitivity variables alter shapes and ranges of the detection zones 46 for object detection. When the vehicle 10 is advancing at relatively high speeds, e.g., greater than 50 kph, the CCU 30 can alter the values of the object detection sensitivity settings to extend the detection zones farther in front of the vehicle than behind the vehicle. At much lower speeds, the detection zones 46 may be less eccentric with respect to the front and rear sides of the vehicle, and the vision system is advantageously used with lower speed traffic in the presence of pedestrian activity close to the vehicle.

Each image processing unit 23 processes image frame data received from the image signal processor 24ISP in each device 18 to detect and classify objects of interest in the individual camera field of view. Classification processing may employ template-based cascades of classifiers based on, for example, Haar features, Local Binary Pattern (LBP) features, Histograms of Oriented Gradients or census features using hardware templates for multiple object classes. In addition to template-based classifiers, the cascades may also include Convolutional Neural Networks as one of the 'parallel classifier' structures which can provide more accurate outcomes than the template-based cascades. In some embodiments one or more cascades of templates may be substituted entirely by Convolutional Neural Networks.

The IPU 23 includes a series of hardware template matching engines (TMEs). Collectively these processors perform parallel classification of the image data in each frame to simultaneously screen for multiple object types with heterogeneous ensembles of, for example, 64 or more cascades of classifiers. The TMEs may include multiple classifier sets for views of the same object type from different directions. Parallel processing with cascades of classifiers enables a large number of object classes to be searched across an image frame to rapidly determine object types. The object detection classifier cascades may be trained for sensitivity to the specific characteristics. Classifications are based on probabilities that an object with a certain characteristic is present within a sub-window of a data frame. Outputs of the TMEs are used to determine a cluster of overlapping scanning windows having a high probability that an object is detected. The image processing unit 23 identifies, from among the cluster of windows, the window with the highest detection probability for a specific object type.

For detection of a single object type, e.g., a face detection, the scan window operations may be limited to the five largest scales of scan windows, with each scan window employing a standard cascade of classifiers which may employ from 50 to 200 Haar or Census classifiers; in a typical embodiment the main cascade will be split into a Haar portion, followed by a Census portion. A sequence of scan windows of the appropriate size are extracted from the main image frame and processed by the classifier cascade. In a hardware embodiment the cascade is implemented by a TME as previously described. The extraction of scan windows of each size may be implemented in software, but may be advantageously implemented in hardware with each image frame written to buffer memory; and extraction of the different size scan windows, with processing by the classifier cascade automated in hardware. The output of the system is a set of 'regions of interest' where relevant objects have been detected. In simplest terms these can be a set of X,Y co-ordinates within the original image frame marking the bounding box around an object.

In some embodiments face detectors are designed based on facial orientations or poses. Left/right, up/down and left-profile/right profile detectors in addition to a frontal face detection cascade facilitate determining a person's direction of movement. A 'back of head' detection cascade may be optimized to handle various hairstyles & shapes.

Additional cascades of classifiers can detect a number of pedestrian subclasses which might otherwise evade classification. For example, some pedestrians may have more skin exposed on arms and legs and pedestrian recognition may require a cascade optimized in this regard. Similarly, other pedestrians might be wearing clothing with distinctive characteristics, e.g., ponchos or large overcoats or skirts that hide the legs of the subject. Optimized cascades for these as well as for recognition of hats, large handbags, shopping bags and umbrellas can facilitate recognition of a pedestrian who might otherwise not be detected.

Synthesizing information from different cascades provides valuable additional information. Detection of a pedestrian 'body' with a 'back of head' face detection suggests a pedestrian is walking in a direction away from the vehicle 10. The combination of a pedestrian detection and a frontal face detection indicates the pedestrian may be walking toward the vehicle 10, perhaps prompting a driver response depending on the motion of the vehicle and the proximity of the pedestrian to the vehicle. Similarly, detection of a pedestrian body together with a left/right-profile face in front of the vehicle may indicate a pedestrian is about to step into the right of way and in front of the vehicle, signaling a need for a driver response in order to prevent a collision.

Specialized detection cascades may also be applied to detect specific human activities such as a person pushing a perambulator or baby carriage or shopping trolley, or a person riding a rollerboard, walking a dog, riding a horse, or riding a battery powered conveyance such as a Segway® or a scooter. The vision system 8 includes additional detection cascades that discriminate between vehicle types (e.g., automobiles; light, medium and heavy trucks; motorcycles, and bicycles) and determine which side of a vehicle is facing a camera, as may be deemed relevant to the direction of vehicle movement.

Object detection and classification includes iteratively performing image scans through the full frame of pixel data in a scene using different scanning windows of fixed size during each iteration. Face detection is exemplary as described in U.S. Pat. No. 8,934,680. After performing a first scan with an initial window of fixed size through the entire image frame, additional scans are performed across the image frame with iterative adjustment of the window size for each subsequent scan, rendering the scan window slightly smaller or larger when performing the next scan through the full image. A common iteration for the window scaling size, based on a factor of 1.2, typically provides sufficient accuracy in challenging applications such as face detection. If a greater level of accuracy is required it is possible to perform more granular size adjustments around the highest probability scan windows with smaller scan step sizes. See, also, U.S. Pat. Nos. 8,170,294 and 8,995,715 incorporated herein by reference.

The suggested use of five scanning window sizes, e.g., for face detection, is only provided as an example. More or fewer scales may be employed for detections, but the full range of scales as normally applied in a conventional face or object detector (i.e., typically more than twenty scales on a full-HD image frame) is not illustrated in the examples, in part because application of a large number of scanning windows may not permit a complete set of scans within time constraints for real time processing of each image frame.

The foregoing reference to adjustment of scan window size does not require actually changing the scan window, and is to be understood more generally to mean a relative change with respect to the size of the full image frame of data being analyzed. Application of a scaling factor to render the scan window slightly smaller or larger means (i) changing the actual scan window size or (ii) down-sampling the image frame to be operated on (e.g., while holding the scan window at a fixed size) or (iii) a combination of both. The meaning of increasing the size of the scan window includes within its scope operating on a down-sampled version of the image frame to, for example, search for a larger size face; and the meaning of reducing the size of a scan window includes applying less down-sampling to the main image frame. Because such operations may be performed with data in RAM, operations based on the iterative changes in scan window size, relative to the size of the full image frame of data being analyzed, can be performed without creating separate constructs (e.g., reduced sets of image data) representative of down-sampled versions of an image frame. Rather, a detection algorithm can operate on a subset of the elements in, for example, the full frame of image data. The subset corresponds to a down-sampled version of the data. The detection algorithm is applied to the down-sampled version of the full image frame of data without creating a separate or distinct data set in memory corresponding to the down-sampled version.

Given that it is necessary to use progressively smaller scanning windows to detect smaller size images, and smaller images require more computations for detection, as the relative size of a scanning window gets smaller relative to the size of an image data frame being operated on, a greater number of window operations must be performed to cover the entire frame of image data. Due to limited processing speed, even with a high-performance processor, at a frame rate of 28-30 fps, only a partial scan of each image frame can be completed at some of the smaller scales. Also, as scan windows get smaller, the step size between window operations in the scans normally also get smaller. These factors further increase the number of scan windows that must be processed in each iteration. While the effective area of the image frame data to be scanned may be reduced, e.g., by only scanning in the immediate vicinity of previously detected objects, this data reduction could preclude detection of new objects entering the fields of view of the cameras 22.

Energy requirements of conventional software implementations for object detection and classification are significant and can become prohibitively intensive when a large number of classifiers operate in parallel. Everywhere enhanced GPU based computation could be employed the power needed to process 20-50 object types at a rate of 30-60 image frames per second becomes too consumptive for in-vehicle use. Each object detector can require a dedicated GPU core using on the order of 0.5 watt. Processing twenty object types per camera would demand an energy budget of tens of watts per image acquisition device 18. In contrast, a hardware implementation using a TME can achieve similar detections using 10's of milliwatts per image acquisition device 18 or, on the order of 0.1 watt for a multi-camera array unit 18AU.

With continual increases in the pixel count in imaging arrays, constraints, which preclude reducing the effective area of the image frame data to be scanned, create a demand for greater processing power to provide real-time responses. With limited processing power it would be difficult, if not impossible, to comprehensively scan across all window scales of a single image frame to provide real-time responses for the vision system 8. For example, in a digital imaging device which generates 4 k or 8 k image frames, $2\times10^6$ scan window operations may be required for a 22×22 pixel size scan window. Per UHDTV standards, a 4 k image frame size is 3840 pixels wide by 2160 pixels tall (8.29 megapixels), and an 8 k image frame size is 7680 pixels wide by 4320 pixels tall (33.18 megapixels).

In a typical hardware template matching engine with a scaling factor of 1.2, based on an initial 22×22 pixel size scan window, iterative scan applications with 20 to 30 additional scan window sizes (or 20 to 30 down-sampled versions of the image frame) are typically required for object detection. See U.S. Pat. No. 8,923,564, "Face Searching and Detection In a Digital Image Acquisition System" to Steinberg, et al. If a smaller scaling factor is applied (e.g., 1.1) to provide better registration accuracy, then iterative scan applications with up to 40 scan window sizes (or up to 40 down-sampled versions of the image frame) would be applied for object detection in a 4K image frame; and iterative scan applications with up to 50 scan window sizes (or up to 50 down-sampled versions of the image frame) would be applied for object detection in an 8K image frame. Given the number of scan window operations required for a 22×22 pixel size scan window for a complete scan through all pixel data in each video frame, it is difficult if not impossible to process all window scales in a single image frame in a 30 ms period to provide real-time responses.

Embodiments of the invention do not require such extensive scanning. Instead, the vision system 8 applies processing criteria requiring a reduced number of scan window operations with limited processing power available in the image processing unit 23 of each device 18 to detect and classify objects of interest. For a given object detection size criterion, the vision system 8 may tailor the size and number of scan windows in each camera field of view in each detection zone to only identify focused objects within a predetermined range of image sizes relative to the field of view captured by the camera.

Detection of an object based on image size criteria indicates a likelihood that the object is within a certain distance region or zone. By subdividing the region 12 into the series of detection zones 46, image size criteria are used with a high level of confidence for detection of objects within each detection zone 46 based on the object detection size criteria. A customized range of image size criteria for each field of view angle limits the number of iterative scan applications to a relatively small number of the largest scanning window sizes. The resulting smaller number of iterations through scanning window sizes for each field of view angle only covers a limited range of image sizes in proportion to the size of the image frame.

With the field of view angle decreasing with increasing distance, as progressively illustrated in FIGS. 2A-2D, images of objects situated in the range of focal distance of a particular detection zone 46 can more assuredly span a sufficiently large proportion (e.g., 5%-10% percent) of a camera's horizontal field of view, to eliminate need for iterative scanning with a conventional full range of 30 to 50 scan window sizes. Thus another feature of embodiments of the invention is the application of an object detection method with a small number of relatively large scan window sizes whereas, conventionally, object detection processes have applied a larger range of 30 to 50 scan window sizes. Scan windows in each zone may, for example, be limited to the five largest of 30 window sizes normally applied to detect objects of interest. This can reduce the number of scanning window operations performed for each image frame to a few thousand or even fewer operations to limit the processing time for object detection to that available for the normal frame rate, e.g., a 15 to 30 ms period, and display real-time information in the vision system 8.

The object detection algorithms applied in these embodiments can detect relatively large images of objects to the exclusion of relatively small images of similar object types that could be detected when applying a full range of 30 to 50 scans which include relatively smaller window sizes. For a given detection zone, e.g., zone 46*b*, relatively small images may be present in a field of view acquired by a device camera 22 for that zone, but such small images may only correspond to objects positioned more distant from the vehicle than that zone, or may otherwise correspond to small objects too small to be of interest. In either case, when processing with the combination of relatively large sized scan windows and associated step sizes, the vision system 8 is not intended to detect such small images for classification. Over the limited and well defined distances of each detection zone 46 (e.g., 2 m to 4 m for zone 46*b*), the variations in image sizes for each object type of interest are relatively small and predictable. This allows for determination of field of view angles based on estimation of object sizes of interest in each detection zone.

By only applying relatively large scan windows to fields of view in the detection zones, each camera field of view in the vision system primarily detects relatively large images. For detection zones relatively close to the peripheral surface 14, the vision system primarily detects relatively close objects. For detection zones more distant from the peripheral surface 14, the vision system primarily detects relatively distant objects. Generally, relatively large scan windows are applied to fields of view in each of the detection zones, with cameras covering detection zones close to the peripheral surface 14 having relatively large field of view angles, and cameras covering detection zones farther from the peripheral surface 14 having relatively narrow field of view angles. Consequently, the size range for which objects are detected in each zone can be limited to larger object images.

Figure 3:
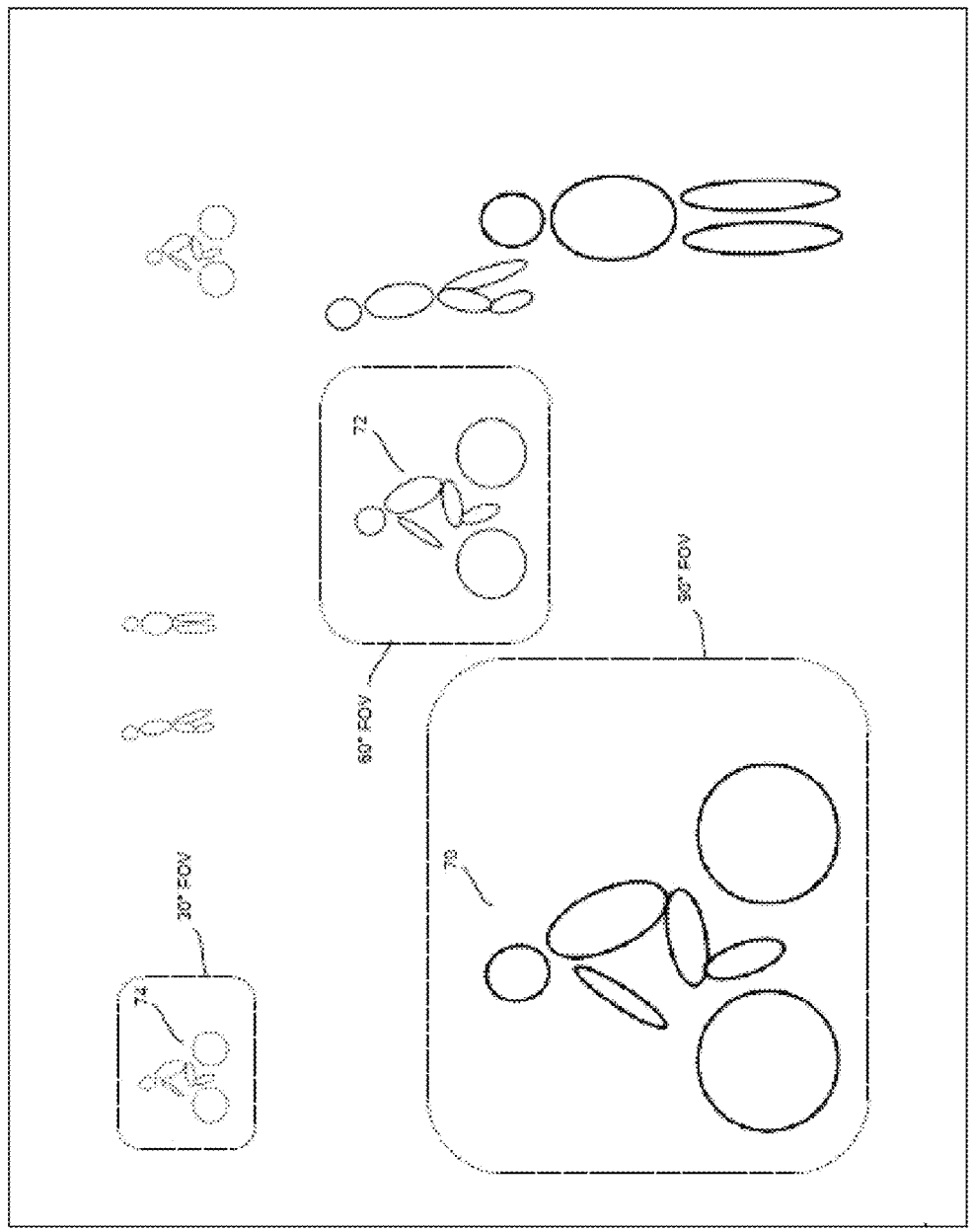
FIG. 3 illustrates size ranges of images for object detection which discriminates between objects positioned in different detection zones created by the vision system.

FIG. 3 simultaneously displays three images of bicycles, each acquired with a different device camera in a different detection zone, to illustrate how each zone can discriminate between image sizes while sustaining a relatively large ratio of object image to frame image size. The figure includes the image 70 of a first bicycle positioned in detection zone 46*b*, within approximately a 2 m to 4 m distance from the vehicle peripheral surface 14; the image 72 of a second bicycle positioned in detection zone 46*c*, between approximately 4 m and 8 m from the vehicle peripheral surface 14; and the image 74 of a third bicycle positioned in detection zone 46*d*, between approximately 8 m and 14 m from the vehicle peripheral surface 14. Object detection is performed on a portion of a scene acquired in the zone 46*b* with a device 18 having captured a 90° field of view. This is indicated with a 90° field of view box "90° fov" illustrating the relatively large size of the image 70 of a rider on a bicycle to the size of the captured scene image used to detect the object in zone 46*b*. Object detection is performed on a portion of a scene acquired in the zone 46*c* with a device 18 having captured a 60° field of view. This is indicated with a 60° field of view box, "60° fov", illustrating the relatively large size of the image of a rider on a bicycle to the size of the captured scene image used to detect the object in zone 46*c*. Object detection is performed on a portion of a scene acquired in the zone 46*d* with a device 18 having captured a 30° field of view. This is indicated with a 30° field of view box "30° fov" illustrating the relatively large size of the image of a rider on a bicycle to the size of the captured scene image used to detect the object in zone 46*d*. Each of the displayed images 70, 72, 74 of a detected rider on a bicycle is relatively large and nearly the size of the corresponding field of view box "90° fov", "60° fov" or "30° fov".

Object detection performed on a field of view acquired in the zone 46*b* with a 90° field of view camera is not expected to identify a smaller image of the second bicycle positioned in detection zone 46*c*, 4 m to 8 m from the peripheral surface 14, or the even smaller image of the third bicycle in detection zone 46*d* 8 m to 14 m from the peripheral surface 14. This is in part because the sizes of the more distant images of the second and third bicycles present in the closer detection zone field of view are too small to be detected with relatively large size scan windows applied for the detection zone 46*b*. The larger scan windows are intended to detect much larger images in the camera fields of view acquired for the detection zone 46*b*, thus forming a ring of limited vision around the vehicle 10 ranging 2 m to 4 m from the peripheral surface 14.

Object detection performed across a second field of view acquired in the detection zone 46*c* with a 60° field of view camera will detect the image 72 of the second bicycle positioned 4 m to 8 m from the peripheral surface 14. Images of the second bicycle may be displayed but not detected in the first field of view acquired for the detection zone 46*a* because the image size of the second bicycle in the detection zone 46*a* is too small relative to the scan window sizes. Based on selection of the field of view angle and scan window sizes for the detection zone 46*b*, the size of the image 72 of the second bicycle, as displayed in the second field of view, acquired with 60° field of view cameras, is not too small to be detected with, for example, the same relatively large scan window sizes used for object detection in the detection zone 46*a*.

Object detection performed across a third field of view acquired in the detection zone 46*d* will detect the image 74 of the third bicycle positioned 8 m to 14 m from the peripheral surface 14. Images of the third bicycle may be displayed but not detected in the first and second fields of view acquired for the detection zones 46*a* and 46*b* because the image sizes of the third bicycle in the detection zones 46*a* and 46*b* are too small relative to the scan window sizes. Based on selection of the field of view angle and scan window sizes for the detection zone 46*c*, the size of the image 74 of the third bicycle, as displayed in the third field of view, acquired with 30° field of view cameras, is not too small to be detected with, for example, the same relatively large scan window sizes used for object detection in the detection zones 46*a* and 46*b*.

In the described embodiments of the vision system 8, the IPU 23 of each image acquisition device 18 computes position information of identified objects. If the devices 18 are in an array unit 18AU having an array unit processor, determinations of position information and other computations may be performed by the array unit processor.

Figure 4:
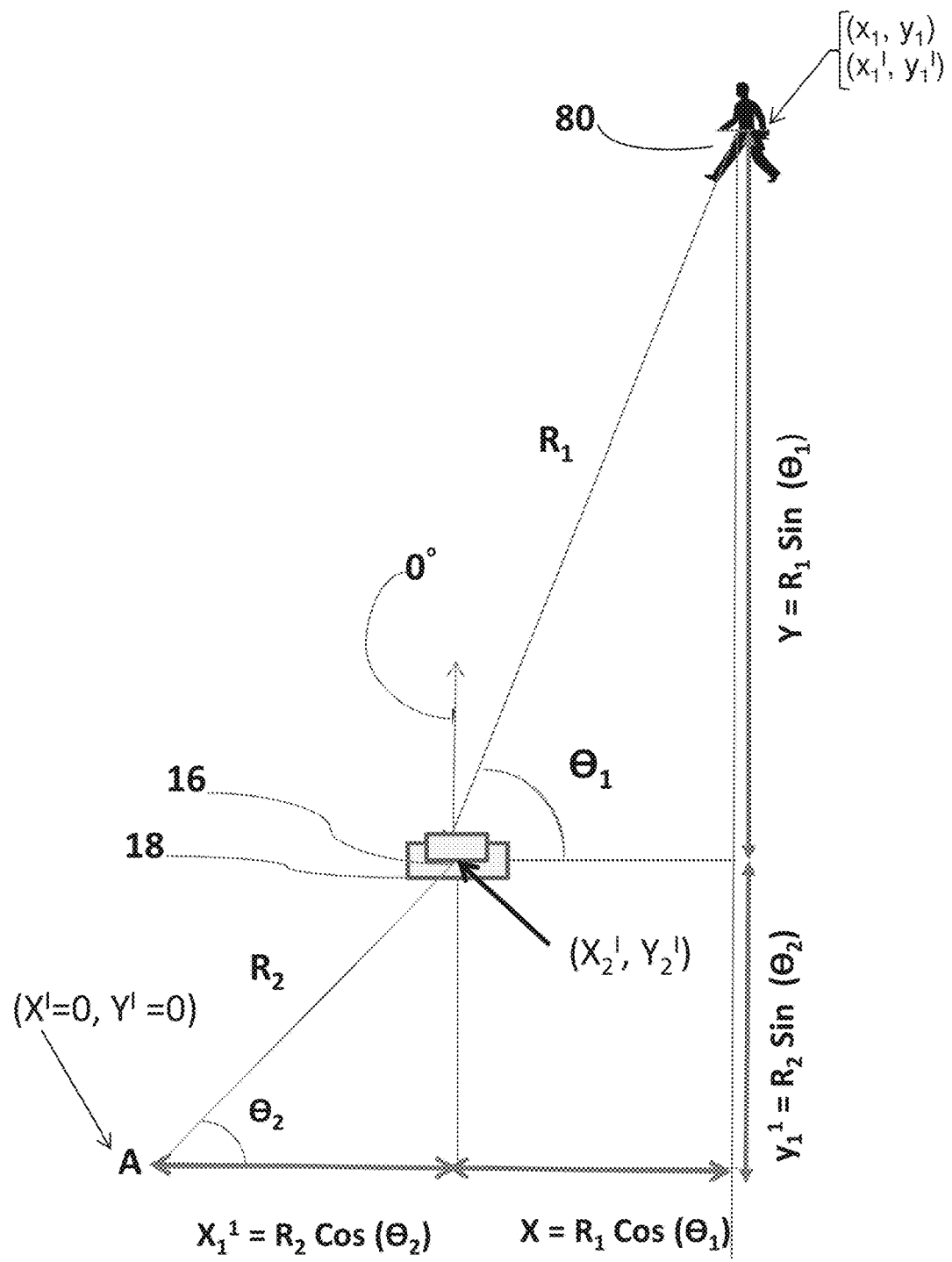
FIG. 4 illustrates exemplary relationships between an object position acquired with an image acquisition device and transformation to a coordinate system common among all image acquisition devices to create map overlays of object data.

The approximate position of a detected object 80 shown in FIG. 4 is determinable based on estimated height or width of the object 80. This may be based on application of different scan window sizes, relative to image frame size, when the object is classified. For the example illustration the height of the object 80, illustrated as a pedestrian is approximated. If the object type is determined to be a truck, the position may be determined based on a combination of estimated length, width and height of the vehicle. The relative image size is applied to determine, approximately, the object distance from the vehicle 10 to the device camera. The position can then be determined based on location of the image in the field of view, which can be converted to an angle relative to the optical axis of the device camera or the complement of the angle as described in FIG. 4. If the classified object type is a vehicle of well-known dimensions (e.g., dimensions of a standard 18 wheel tractor trailer combination), the approximated size information may be refined using known size information stored in a database. Given the distance to the object and the angle in the field of view at which the object is located, the object position is initially expressed in polar coordinates. This location information is converted from a polar co-ordinate system, having an origin at the detection device 18, to a rectangular co-ordinate system common to all objects detected by all image acquisition devices.

FIG. 4 illustrates geometric relationships to which coordinate conversion and transformation mathematics are applied to determine the position of the object 80 (e.g., a pedestrian) relative to a reference position, A on the vehicle 10. See FIG. 1A. This position information is sent over the CAN bus 16 to the CCU 30 for overlay on the map displayed on the screen 62.

Initially, time varying position data for the detected object, 80, is based on determination of the image position in polar coordinates: (i) the distance $R_1$ between the object and the camera, and (ii) an angle of position, $\Phi_1$, of the image relative to the optical axis, O, of the device camera where $\Phi_1 + \theta_1 = 90°$.

Once the position of the detected object 80 is determined in polar coordinates, the location of the object is determined relative to the common coordinate system for all object position data among the plurality of devices 18, having an origin at a reference position, A, on the surface of the vehicle 10. See FIG. 1A.

To this end, a polar to Cartesian coordinate conversion is performed to describe the location of the object 80 in a first rectangular coordinate system (X, Y) having an origin (X=0, Y=0) at the device camera. Next, a coordinate transformation is performed from the first rectangular coordinate system (X, Y) to a second rectangular coordinate system (X', Y') based on the known position of each device 18, expressed as a distance $R_2$ between the reference position, A, and the position of each device 18 along the peripheral surface 14. This is initially expressed in polar coordinates as $R_2, \theta_2$ where $\theta_2$ is the angle about the point A, relative to the axis along which the X' direction extends. The second rectangular coordinate system (X', Y') has an origin (X'=0, Y'=0) at the common reference position, A. The position of the object relative to the origin in the first rectangular coordinate system is given as $(X_1, Y_1)$. The position of the object relative to the origin in the second rectangular coordinate system, referred to as $(X'_1, Y'_1)$ is based on the sum of the distance from the origin (X'=0, Y'=0) to the device camera position, referred to as $(X'_2, Y'_2)$ in the second rectangular coordinate system, and the distance from the device camera position to the object position $(X_1, Y_1)$:

$$X'_2 = (R_1 \cos(\Theta_1) + (R_2 \cos(\Theta_2),$$

$$Y'_2 = (R_1 \sin(\Theta_1) + (R_2 \sin(\Theta_2)$$

Each image acquisition device 18 periodically updates and sends position information of detected objects, relative to the common reference position, A, of the vehicle 10 to the CCU 30. In accord with the position data, icons 15, representative of the objects, are placed on the screen 62 for display with the street map for viewing by the driver. See FIG. 5 which illustrates a series of icons: pedestrians 15-1, cyclists 15-2, and vehicles 15-3 displayed on the screen 62. The rate at which position data is updated may be less than the frame rate.

In summary, a method of displaying position information of objects includes:
1. Classifying different identified objects with different image acquisition devices, each device including a camera that captures an image of an object in a field of view having a field of view angle relative to an optical axis, and a processing unit performing the classification according to object type;
2. For each in a plurality of objects detected with at least one image acquisition device, processing acquired optical information to determine position information for the object, relative to said at least one image acquisition device with which the object is detected, including (i) distance between the object and said one image acquisition device based on approximate size of the object image and (ii) angle of object image position in the field of view of said one image acquisition device;
3. For each detected object, transforming the position information of the object as determined with a said at least one image acquisition device, and relative to the position of the said one image acquisition device, to revised position information based on a common reference position so that the position of each in the plurality of detected objects is defined relative to the common reference position; and
4. Simultaneously displaying the position of each detected object on a display screen.

The foregoing method may include transforming the position information of each in the plurality of detected objects to the revised position information with computations performed by the image acquisition device which processes the acquired optical information. The method may further include transmitting the revised reference information acquired for each in the plurality of detected objects to a central control unit for simultaneous display of the position of each detected object based on the common reference position. The position of each detected object based on the common reference position may be presented by display of an icon 15 based on determination of object type by application of a template matching engine.

Summary of Advantages and Features of Embodiments

Classification and position data generated by image acquisition devices 18 in each of the series 20a-20d is assimilated by the CCU 30 to provide relevant real-time object information for up to a 360° field of view about the vehicle 10 and for a variable range of focal distances in each series. The CCU 30 provides multiple fields of view with variable angles and variable ranges of focal distances to enable changes in the size and number of detection zones 46 which extend away from the vehicle 10. Object detection and classification can be had over a full range of relevant distances from the vehicle 10 (e.g., up to 80 meters) for comprehensive detection and classification of objects of interest during vehicle movement from low speeds to high speeds.

FIG. 1C illustrates a supplemental device connection providing video feeds. HS bus transceiver 26HS of an image acquisition device 18 is shown in FIG. 1D is connected to the HS bus receiver 30d of the CCU 30 via a High Speed network cable 58 in the bus 54. With this arrangement the camera video, otherwise only used to identify and track objects of interest for the overlay of object data on the map displayed on screen 62, is deployed for additional monitoring. To improve safety, in certain driving situations sensors or switches or information from an electronic control unit (ECU) may cause the CCU 30 to automatically trigger selection of video feeds generated by cameras in select devices 18. This may display rear view images when a vehicle is backing up or parallel parking. Object type or position information acquired over the CAN bus 16 may also trigger selection of relevant video feeds for enhanced driver awareness. When the CCU 30 selects video feeds for display, the CCU 30 may also send commands to interfaces 28 of the devices 18, which are providing the video feeds, to automatically change camera settings such as field of view angles or focal depths. Changes in these settings may be based on object type or object position information for a similar field of view acquired over the CAN bus 16 from another device.

Combinations of adjustable depths of focus and non-uniform spacing between cameras 18 also facilitate variation in effective zone shapes for object detection. When the peripheral surface 14 has a circular shape, instead of the generally rectangular shape shown in the plan view of FIG. 1A, equally spaced cameras placed along the surface (having identical field of view angles with optical axes extending in radial directions) would result in overlapping vision capabilities beginning at the same outward radial distance from the vehicle surface. Consequently the inner border of each detection zone 46 would be circular and concentric with the circular shape of the peripheral surface. With each camera 22 in the same detection zone also having the same range of focus, extending from along the inner border of the detection zone, the volume of the region covered by the zone for effective object detection will generally be in the shape of a circular ring.

However, again assuming a peripheral surface with a circular shape, but with non-uniform spacing between the device cameras 22, overlapping fields of view between adjoining cameras in the same detection zone 46 do not occur at the same radial distance from the circular peripheral surface. This imparts a variable zone shape as a function of position around the circular peripheral surface. Like considerations apply when the shape of the peripheral surface is rectangular or otherwise follows an oblong or asymmetric contour. Referring to FIG. 1A and FIGS. 2A-2D, with non-uniform spacing between the device cameras 22 positioned along the peripheral surface 14, the minimum distance from the peripheral surface 14, at which overlapping fields of view occur between adjoining cameras in the same detection zone 46, varies.

Generally, gaps between the fields of view acquired by adjacent device cameras can result from asymmetries in the shape of the vehicle surface and constraints in camera spacings. To remove the gaps and reduce variations in overlap due to asymmetries in the shape of the vehicle surface, the cameras 22 may have adjustable settings enabling the field of view angles of individual devices 18 in a series 20 to be programmably controlled. For example, instead of having all field of view angles in the series 20$b$ fixed at 90 degrees, the CCU 30 can be programmed to automatically adjust one or more field of view angles to assure that all fields of view have similar degrees of overlap.

It is apparent from the above illustrations that boundaries between adjoining detection zones 46 can vary as a function of position around the peripheral surface of a structure. For a vehicle 10 of generally rectangular shape, a varied pattern of spacings between cameras results in varied overlap in fields of view and, therefore, varied vision capabilities along a ring having the shape of an ellipse. There is a variable distance between the vehicle peripheral surface and the inner border of the detection zone 46 as a function of position around the peripheral surface 14. With the rectangular shape of the peripheral surface 14 shown in the figures, cameras 22 of devices 18 in the same series 20 may be spaced relatively far apart along the larger opposing sides (which correspond to the longer sides of the vehicle), while other cameras are spaced relatively close along the front of the vehicle and, perhaps, a single camera may be provided along the rear side. Such an irregular pattern of spacings between cameras results in gaps and overlapping of fields of view between adjacent cameras 22 occurring at varied distances from the peripheral surface 14. The variations in distances at which the overlap from the peripheral surface 14 occurs may be reduced: by adding more device cameras in each series 20, by adjusting spacing between cameras 22 in the same series 20 without adding more cameras, by adjusting the camera field of view angles or, as noted for device cameras 22 adjacent rectangular corner areas of the vehicle 10, by rotating the vertices of field of view angles along the ground plane GP. The foregoing can eliminate vision gaps and extend continuous vision along all vehicle sides with minimal variation in distance between points of overlap in the field of view angles and the peripheral surface 14.

Illustrated examples of the vision system 8 enhance awareness of traffic and safety issues about a motor vehicle 10. Instead of providing to an operator of the vehicle 10 streaming video over a limited field of view with a limited number of cameras, the vision system 8 can monitor up to 360° of dynamically changing surroundings, can automatically identify types of objects (e.g., cars, trucks, motorcycles, pedestrians and bicycles) and can display time varying positions of these objects relative to the vehicle 10 as information viewable by the driver as an overlay on a map. With a partitioning of the surrounding environment into a series of detection zones 46 which extends away from the vehicle 10, the optical design and settings for each image acquisition device can be optimized for detection and classification in each zone with consideration given to changing environmental factors including lighting conditions. In contrast to the foregoing, a conventional design of an optical module for imaging a landscape would normally provide a large depth of focus so that all of an imaged scene, from a minimum distance of perhaps 2 m to infinity would be in focus. Processors in embodiments of the vision system 8 can customize and apply image acquisition settings (e.g., speed, focal distance or depth of field) for cameras 22 assigned to each detection zone 46 or to individual portions within a detection zone 46 to provide more limited, but more optimal depths of focus, based in part on distances between the peripheral surface 14 and portions of each one of the detection zones 46.

In one set of embodiments the system provides a single focal distance and depth of field for the entirety of each detection zone 46. In another set of embodiments, more optimal settings can be defined for individual portions of highly eccentric zone shapes and a detection zone 46 may change shape and size as a function of vehicle speed. In a series 20 of image acquisition devices, a first camera, covering a first segment of a detection zone 46 of elliptical shape, may require a focal distance range which extends farther from the peripheral surface 14, or farther from the center of the vehicle 10, than the focal distance range of a second camera covering a second segment of the same detection zone 46. In some instances it may be feasible to provide for the first camera a different depth of field than that of the second camera. Segments 46-max and 46-min in detection zone 46$c$ of FIG. 1A are exemplary of differences in distances for which customized camera settings may enhance discrimination between two similar objects located in different detection zones 46 to improve accuracy in both object classification and position determination. Such enhanced precision may be most relevant at close distances when (i) the vehicle is moving at high speeds, (ii) focal distance is relatively small, (iii) depth of field is more easily controllable and (iv) driver reaction time is short.

In other embodiments of the vision system 8, the depth of field of a detection zone may be controlled, e.g., based on optical settings, to supplement the ability to discriminate between objects positioned within a detection zone and other objects by selecting field of view angles to detect objects based on the image size relative to the size of the image frame.

The device cameras 22 are not limited to fixed focus lens designs, and may employ customized or programmably adjustable focal distances, depths of field and exposure speeds. To the extent a lens system and camera speed are adjustable to provide a customized depth of field in a focus region 48, the width of the detection zone 46, for purposes of applying object detection and template matching criteria, can be variable, instead of providing all device cameras in the same detection zone 46 with the same field of view angle, the same depth of field and the same focus distance, and these variables may be adjusted on the fly as a function of driving and traffic conditions to further enhance detection of objects positioned in a specific detection zone.

The camera optical settings of each image acquisition device 18 assigned to a series 20 may be programmably adjustable to alter shapes and dimensions of portions of detection zones 46, e.g., by changing a depth of field provided by a lens or changing field of view angles of select cameras within a particular series 20 to enhance monitoring within a detection zone 46. In those embodiments where settings of the devices 18 are not programmable or user adjustable, the devices in each series may have identical or otherwise pre-determined settings.

The CCU 30 may be programmed to reassign image acquisition devices 18 among different ones of the series 20a-20d to more optimally detect and track objects in different detection zones 46. That is, assignment of individual image acquisition devices 18 in each array 20 is fully reconfigurable during operation of the vision system 18 and reassignment of the devices 18 in each array unit 18AU can be automatically optimized as roadway situations change or automatically customized based on predefined criteria. Device reassignment may be responsive to abrupt changes in traffic conditions or vehicle speeds or other situational considerations, including driver prompts to improve visibility. In conjunction with reassignment of a device 18 to a different series 20, instructions may be sent from the CCU 30 via a CAN transceiver 40, to the device or to an array unit 18AU in which the device is positioned, to change device camera image settings or camera pointing angles.

In one application, when the system 8 determines that the vehicle 10 is moving toward an intersection at a high speed, there is a first redeployment of devices to "look" farther ahead at relatively smaller objects, deploying more cameras 22 to monitor in the direction of travel with relatively smaller field of view angles (e.g., less than 30°). That is, device cameras are deployable to extend part of a detection zone farther, in the forward direction, from the vehicle than other portions of the detection zone for which device cameras provide views behind and along each side of the vehicle 10. The detection zone then acquires a greater eccentricity, e.g., in an elliptical shape, in order to temporarily monitor activities a greater distance in front of the vehicle.

As part of the redeployment, by automatically changing the shape and distance of part or all of a detection zone 46, the system 8 is able to distinguish between cross traffic approaching an intersection and vehicles ahead of the vehicle 10 which may be stopped at the intersection. Simultaneous with detecting movement of vehicles near the intersection, the system 8 also determines the status of a traffic control signal at the intersection. Within moments after the first redeployment, a second redeployment of devices 18 monitors part of another detection zone relatively closer to the vehicle 10 with devices 18 set to relatively large field of view angles (e.g., greater than 60°) that monitor traffic activities as the vehicle 10 comes into close range of a stopped vehicle in the same driving lane as the vehicle 10. Based on information acquired in one or more detection zones 46, if the vehicle 10 approaches a stopped vehicle at an unsafe speed, the system provides a driver alert, or takes other action which may include taking control of the vehicle braking system.

Speed and accuracy of detection in a highly eccentric zone may be enhanced by adjusting device camera focal distances or depths of field relative to cameras monitoring other parts of the same detection zone. Camera image settings and pointing angles may also be placed directly under user control to, for example, pan about a multi-camera field of view or generate enlarged views.

With the CCU 30 configured to receive multiple feeds transmitted with different protocols, it changes selection of the feed sent to the display screen 62 based on predetermined criteria. When a determination is made by the CCU 30 that one of the selection criteria is met, the input selection changes from a default mode, in which the data feed is received via the CCU CAN transceiver 40, to begin assimilating multi-channel frames of camera video data sent via a High Speed (HS) data bus 54 (e.g., based on an IEEE1394 serial bus architecture). Video data are sent from the selected image acquisition devices 18 via the transceiver 26HS in each data communications interface 26 of a selected device 18. The HS video data fed from each selected device 18 are received by a different one of multiple input channels in the digital video receiver 30d for the CCU 30 to generate composite screen presentations of the multi-channel video feeds by combining different fields of view captured by the individual cameras 22.

The invention is not limited to the described embodiments, which may be amended or modified without departing from the scope of the present invention. Rather, the invention is only limited by the claims which follow.

The claimed invention is:

1. A method of identifying an object of interest in a zone of a region about a moving vehicle based on sizes of object images, comprising:

acquiring a scene image in a different field of view for each in a series of at least two zones of the region about the structure where a first zone is relatively close to the structure and a second zone, separate and distinct from the first zone, extends farther away from the structure than the first zone, wherein:

a first of the scene images is acquired with an image acquisition depth of field setting that sufficiently resolves an image of a first object positioned in the first zone for identification as a first object type with template matching criteria, while an image of a second object of the first object type positioned in the second zone cannot be sufficiently resolved in the first of the scene images for identification as a first object type with the template matching criteria; and a second of the scene images is acquired with an image acquisition depth of field setting that sufficiently resolves an image of a second object positioned in the second zone for identification as a first object type with the template matching criteria, while an image of the first object of the first object type positioned in the first zone cannot be sufficiently resolved in the second of the scene images for identification as a first object type with the template matching criteria.

2. The method of claim 1 wherein the first scene image subtends a first field of view angle and the second scene image subtends a second field of view angle, the method including:
applying a first additional criterion requiring, in order for the first object to be identified as an object of interest in the first zone, that the image of the first object be within a predetermined first range of sizes relative to the given size of the frame of image data based on the first field of view angle, said first additional criterion enabling identification of images of objects positioned within the first zone.

3. The method of claim 1 further including:
applying a second criterion to identify an image of the second object when present in a second of the acquired scene images as the first object type, while the second object is positioned in the second zone and wherein the second scene image subtends a second field of view angle,
the second criterion requiring, in order for the second object to be identified as an object of interest in the second zone, that the image of the second object in the second of the acquired scene images be within a predetermined second range of sizes relative to the given size of the frame of image data based on the second field of view angle, said second criterion enabling identification of the image of the second object in the second scene image when the second object is positioned within the second zone based, in part, on size of the image of the second object in the second scene relative to the given size of the frame of image data based on the second field of view angle.

4. A method of detecting the presence of an object in a region extending above a surface and positioned beyond a border, the region including at least first and second zones, each zone having a different spacing from the border, the method including:
acquiring a frame of image data, spanning a field of view angle corresponding to a portion of the region, from a position along the border;
applying object detection criteria to analyze an image of an object in the frame of data, including application of a template matching process to classify the object among a set of object types,
wherein a determination is made whether the object is present in the first zone based on an effective application of a first series of scan windows, effectively varying in size over a first range of window sizes relative to the size of the image frame which application of the first range of window sizes only permits detection of images limited in size to a first range of image sizes; and
wherein a determination is made whether the object is present in the second zone based on an effective application of a second series of scan windows effectively varying in size over a second range of window sizes relative to the size of the image frame which application of the second range of window sizes only permits detection of images limited in size to a second range of image sizes.

5. The method of claim 4 where the first range of scan window sizes and the second range of scan window sizes are each smaller in range than the range of a third possible series of scan window sizes which would permit detection of images varying in size over a third range of image sizes greater than each of the first range of image sizes and the second range of image sizes.

6. The method of claim 4 where the first range of scan window sizes and the second range of scan window sizes are identical.

7. The method of claim 4 where the frame of image data has a predetermined number of pixels and the effective application of the first series of scan windows that effectively varies in size over the first range of window sizes is had by applying one scan window of a fixed size relative to the frame of image data having the predetermined number of pixels by down-sampling the number of pixels to provide smaller frames of image data relative to the one scan window of the fixed size.

8. The method of claim 7 where the effective application of the second series of scan windows that effectively varies in size over the second range of window sizes is also had by applying one scan window of a fixed size relative to the frame of image data having the predetermined number of pixels by down-sampling the number of pixels to provide smaller frames of image data relative to the one scan window of the fixed size.

9. The method of claim 4 where the object is classified as an object type with parallel classifier cascades based on one or more of a Haar measure, local binary pattern features, a histogram of oriented gradients, and a census transform, and the object types include vehicles and pedestrians.

10. The method of claim 4 where the border is a peripheral surface along a vehicle.

11. The method of claim 4 where the frame of image data is acquired with an imaging system providing the field of view angle along an optical axis and the position of the object is determined based on position of the image of the object in the field of view relative to the optical axis and relative size of the image of the object to the frame of image data.

12. A method of displaying position information of objects, comprising:
classifying different identified objects with different image acquisition devices, each image acquisition device including a camera that captures an image of an object in a field of view having a field of view angle relative to an optical axis, and a processing unit performing the classification according to object type;
for each in a plurality of objects detected with at least one image acquisition device, processing acquired optical information to determine position information for the object, relative to said at least one image acquisition device with which the object is detected, including (i) distance between the object and said one image acquisition device based on approximate size of the object image and (ii) angle of object image position in the field of view of said one image acquisition device;
for each detected object, transforming the position information of the object as determined with said at least one image acquisition device, and relative to the position of the said one image acquisition device, to revised position information based on a common reference position so that the position of each in the plurality of detected objects is defined relative to the common reference position; and
transmitting the revised position information from each detected object from the plurality of image acquisition devices so as to simultaneously display the position of each detected object on a display screen.

13. The method of claim 12 including transforming the position information of each in the plurality of detected objects to the revised position information with computations performed by the image acquisition device which processes the acquired optical information.

14. The method of claim 12 including, prior to displaying the position of each detected object, transmitting the revised reference information acquired for each in the plurality of detected objects to a central control unit.

15. The method of claim 12 where the position of each detected object based on the common reference position is presented by display of a selected icon, selection of each icon based on application of a template matching engine to determine each object type.

16. The method of claim 12, wherein each of the plurality of image acquisition devices transmit the revised position information for the objects detected by the respective image acquisition device to a central control unit.

17. The method of claim 12, wherein each of the plurality of image acquisition devices determines a classification the object detected by the respective image acquisition device, and wherein the image acquisition device transmits the classification of the object to the central control unit.

18. The method of claim 1, wherein the first scene images are captured with an imaging device having a first focal length, and the second scene images are captured with another imaging device having a second focal length, the second focal length being different from the first focal length.

19. The method of claim 1 wherein at least one of the first focal length or the second focal length is a fixed focal length.

20. The method of claim 4, wherein:
the first series of scan windows are captured using an imaging device having a first focal length, and the second series of scan windows are captured using another imaging device having a second focal length, the second focal length being different from the first focal length; and
the first imaging device or the second imaging device provides programmably adjustable focal distances or a fixed focal length.

* * * * *